United States Patent
Yano et al.

(10) Patent No.: US 7,057,886 B2
(45) Date of Patent: Jun. 6, 2006

(54) DISPLAY UNIT

(75) Inventors: Kazuyoshi Yano, Tokyo (JP); Keiko Yabuki, Tokyo (JP); Takaaki Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 10/276,930

(22) PCT Filed: Mar. 22, 2002

(86) PCT No.: PCT/JP02/02791

§ 371 (c)(1),
(2), (4) Date: Apr. 14, 2003

(87) PCT Pub. No.: WO02/077952

PCT Pub. Date: Oct. 3, 2002

(65) Prior Publication Data

US 2003/0156095 A1    Aug. 21, 2003

(51) Int. Cl.
*G06F 1/16*    (2006.01)
(52) U.S. Cl. ......................................... 361/681; 16/341
(58) Field of Classification Search ............... 361/681, 361/683, 686; 16/341, 342
See application file for complete search history.

(56) References Cited

U.S. PATENT DOCUMENTS

| | | | |
|---|---|---|---|
| 5,128,829 A * | 7/1992 | Loew | 361/683 |
| 5,168,426 A * | 12/1992 | Hoving et al. | 361/681 |
| 5,666,694 A * | 9/1997 | Slow et al. | 16/342 |
| 5,682,182 A * | 10/1997 | Tsubosaka | 361/681 |
| 5,796,575 A * | 8/1998 | Podwalny et al. | 361/681 |
| 6,034,866 A * | 3/2000 | Nobuchi et al. | 361/681 |
| 6,154,359 A * | 11/2000 | Kamikakai et al. | 361/681 |
| 6,378,171 B1 * | 4/2002 | Suzuki et al. | 16/342 |
| 6,601,269 B1 * | 8/2003 | Oshima et al. | 16/342 |

* cited by examiner

*Primary Examiner*—Lisa Lea-Edmonds
(74) *Attorney, Agent, or Firm*—Jay H. Maioli

(57) ABSTRACT

A display device includes a cabinet that has a liquid crystal display; a connection section that is rotatably provided relative to the cabinet about a first rotating shaft and parallel to the liquid crystal display; a cover body that is rotatably provided relative to the connection section about a second rotating shaft parallel to the first rotating shaft and that opens and closes the liquid crystal display; and spring pins that are provided in at least one of the first rotating shaft and the second rotating shaft and that generate frictional forces upon rotating of the connection section and/or the cover body.

7 Claims, 19 Drawing Sheets

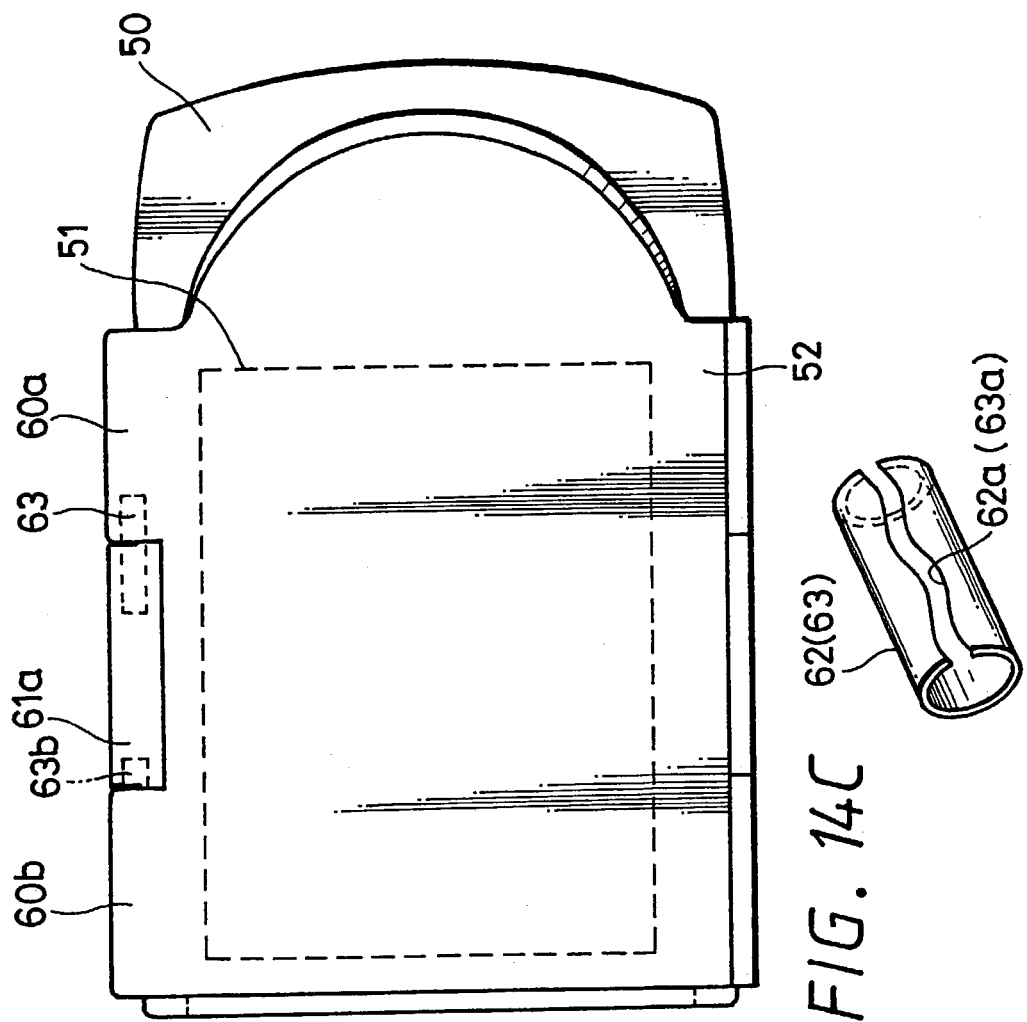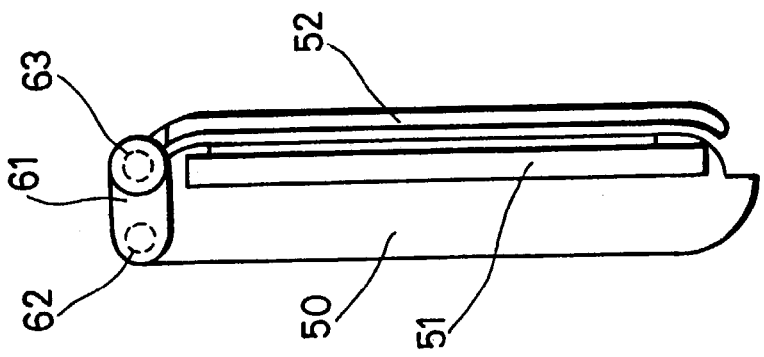

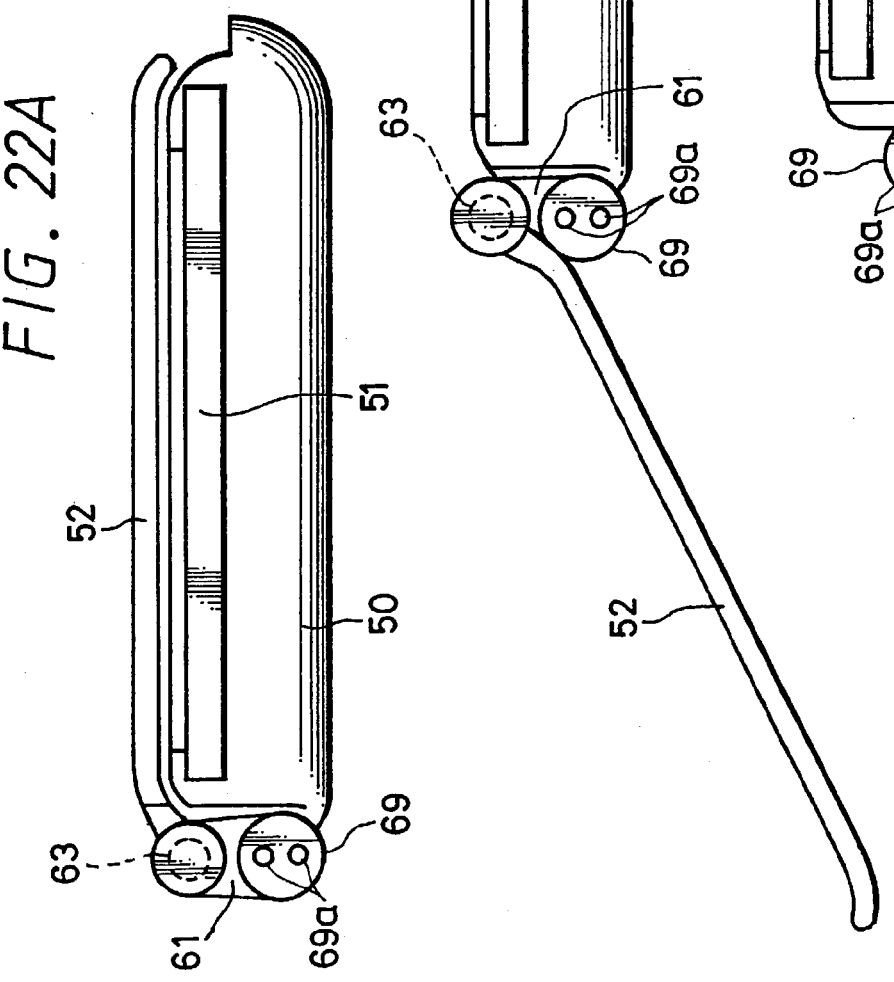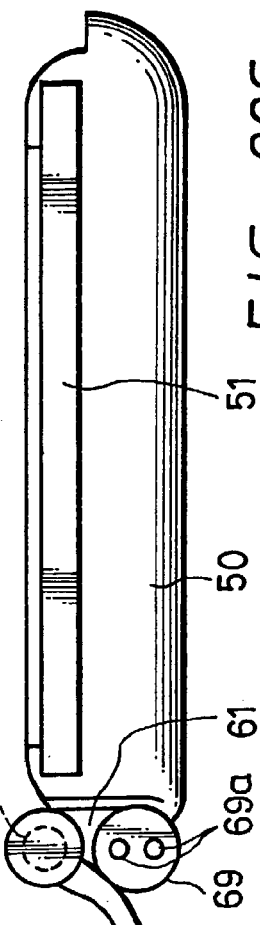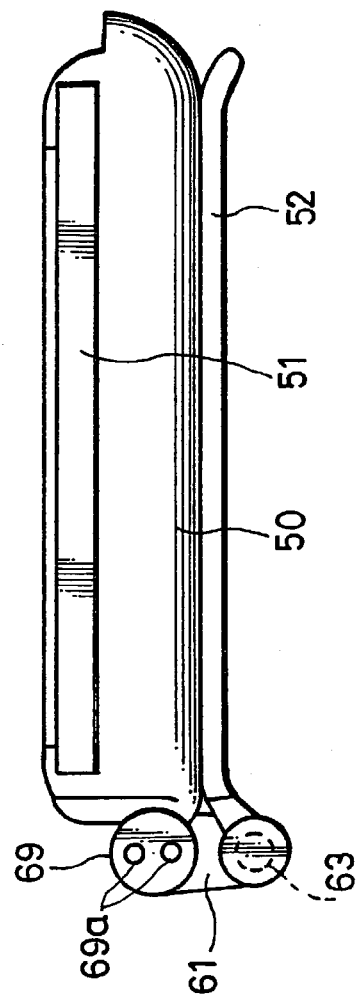

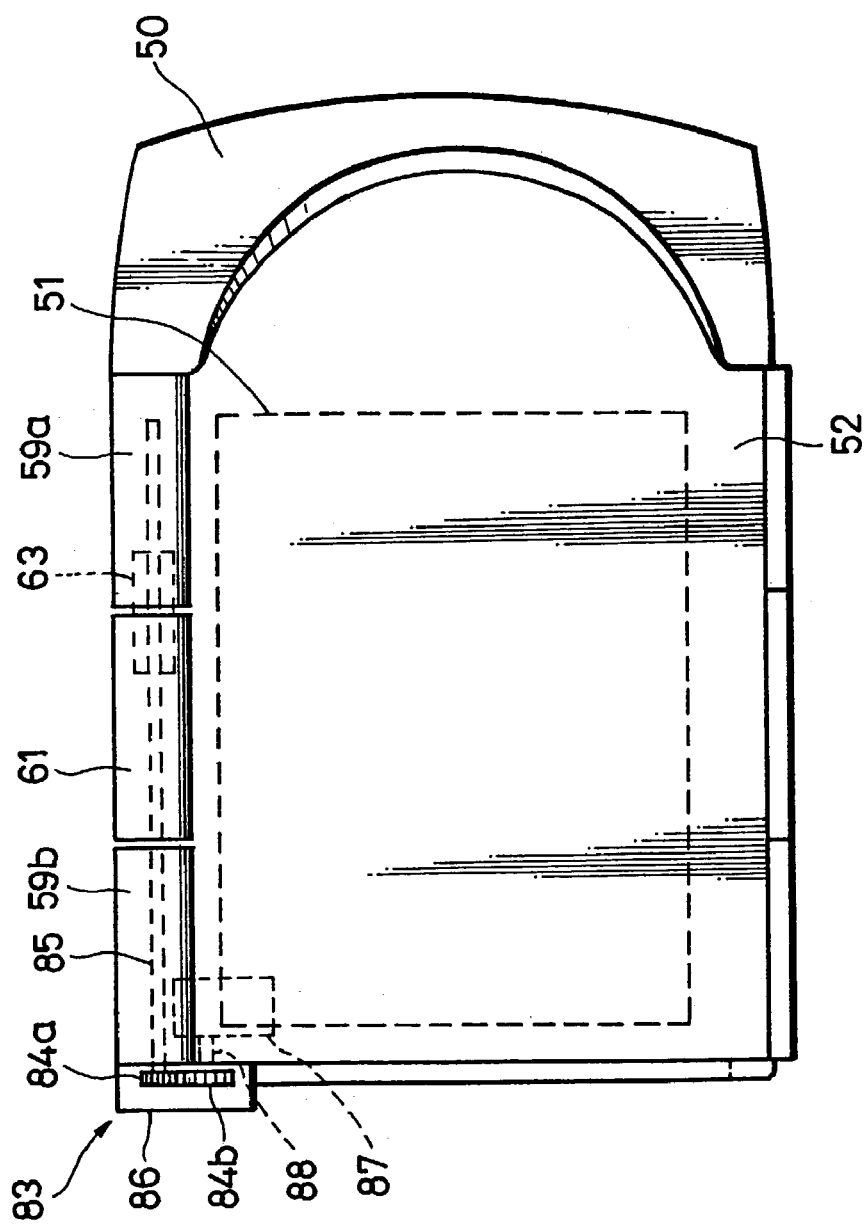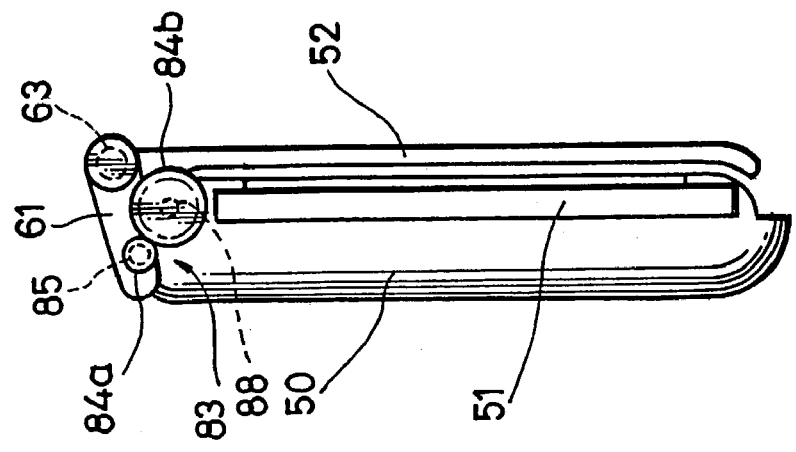

DISPLAY UNIT

TECHNICAL FIELD

The present invention relates to a display device which comprises a display device main body provided with a display section, and a cover body covering the display section of the display device main body.

BACKGROUND ART

In a conventional display device, such as PDA (Personal Digital Assistants), a small word-processor, a small computer, a small electronic dictionary, a portable television receiver, and an electronic clock, a cover body (cover) for covering the display section has been rotatably fitted relative to the display device main body.

However, there has been no proposal that the cover body in such a display device may be held at a desired angle to the display section of the display device main body when the cover body is opened.

DISCLOSURE OF THE INVENTION

Considering the above circumstances, the present invention has proposed a display device which comprises a display device main body, and a cover body covering the display section of the display device main body, wherein the cover body is rotatably fitted relative to the display device main body, and which may hold the cover body at a desired angle to the display section of the display device main body.

In order to solve the above described problems and the like, and to achieve the above object, a display device according to the present application is characterized by comprising: a display device main body which has a display section; a connection section which is rotatably provided, relative to the display device main body, about a first rotating shaft parallel to the display section; a cover body which is rotatably provided in the connection section about a second rotating shaft parallel to the first rotating shaft, and opens and closes the display section; and resisting means which is provided on at least one of the first rotating shaft and the second rotating shaft of the connection section, and generates a frictional force at a time when the connection section and/or the cover body rotates.

By the above described configuration, the display device according to the present application may hold the cover body at a predetermined angle to the display section of the display device main body, and may fix the cover body at an arbitrary position by giving friction to the cover body. At the same time, the cover body may be used for protection of the display section and also as a wall to prevent others from peeping at the display section. Furthermore, the cover body may be also used as a stand for the display device main body.

BRIEF DESCRIPTION OF DRAWINGS

FIG. 14A is a front view of the display device according to the first embodiment of the present invention.

FIG. 14B is a side view of the display device according to the first embodiment of the present invention.

FIG. 14C is an enlarged perspective view of a spring pin in the display device according to the first embodiment of the present invention.

FIG. 17 explains a used state of the first embodiment of the display device according to the present invention, wherein

FIG. 18 explains a used state of the first embodiment of the display device according to the present invention, wherein

FIG. 19 shows a second embodiment of a display device according to the presents invention, wherein

FIG. 21 shows a forth embodiment according to the present invention, wherein

FIG. 22 shows a fifth embodiment according to the present invention, wherein FIG. 22A is a side view of the cover body which is closed; FIG. 22B is a side view of the cover body which is opened at an angle of approximately 180 degrees; and FIG. 22C is a side view of the cover body which is opened at an angle of 360 degrees.

FIG. 23 shows a sixth embodiment according to the present invention, wherein FIG. 23A is a front view of the cover body which is closed and FIG. 23B is a side view of the cover body which is closed.

BEST MODE FOR CARRYING OUT THE INVENTION

Hereinafter, embodiments of the present invention will be described, referring to attached drawings. FIGS. 1 to 23 show an embodiment of an electronic device provided with a control device which comprises display devices according to embodiments of the present invention, and the electronic device is configured as a portable DVD player.

Figure 1:
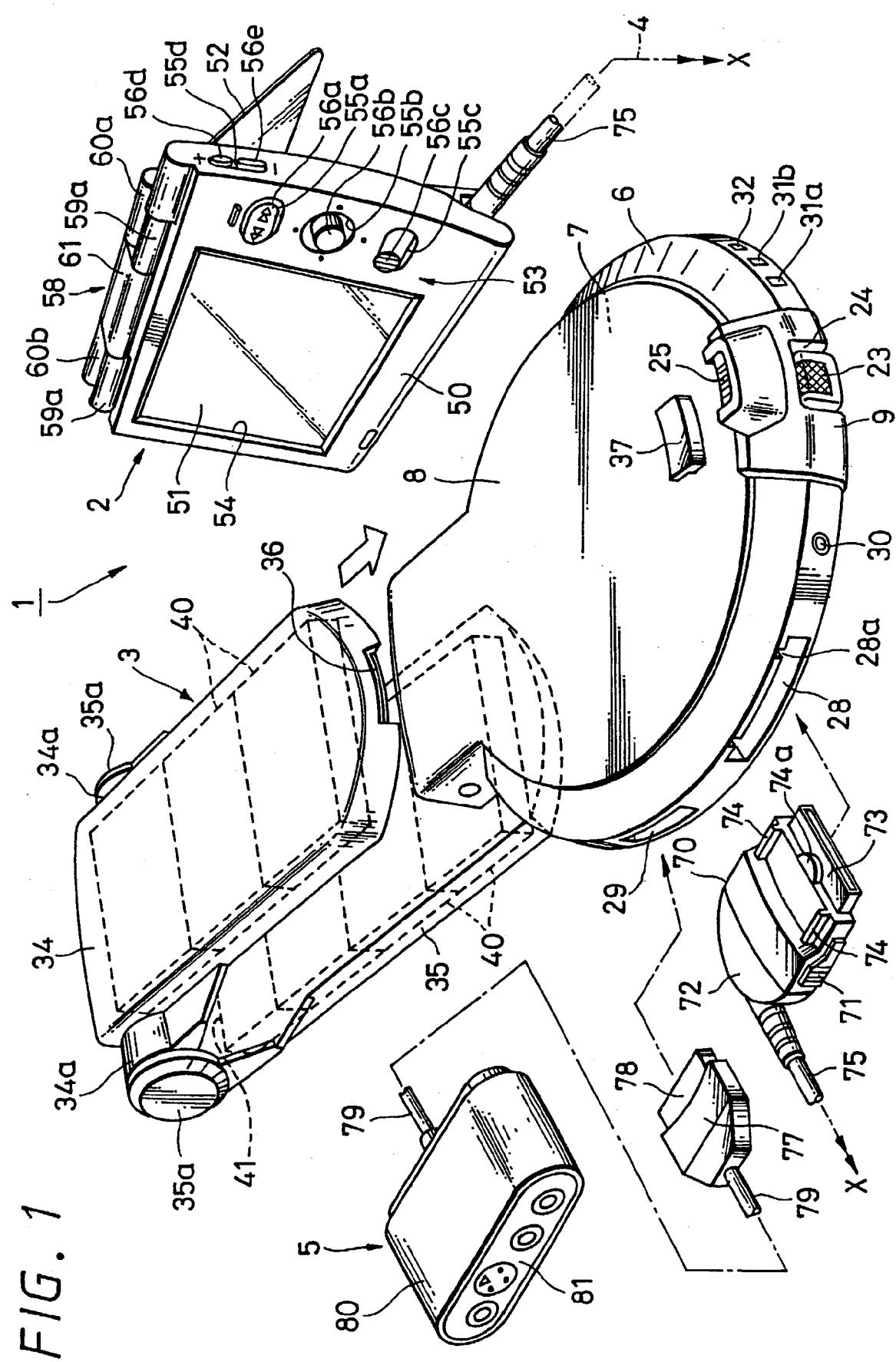
FIG. 1 is a perspective view showing a configuration of an electronic device which is provided with a control device with a display device according to an embodiment of the present invention.

As shown in FIG. 1, the DVD player 1 is configured to comprise: a player main body 6 for DVD (Digital Versatile Disc) which represents one concrete example of an information recording and reproducing device; a control device 2 for remote control of operations of the player main body 6; and a battery chassis body 3 which supplies electric power to the control device 2 and the player main body 6. And, the player main body 6 and the control device 2 are connected through a first connection cable 4 which represents one concrete example of signal transmission means. Moreover, the player main body 6 and the other electronic devices (for example, a television set) are connected through a second connection cable 5 of similar signal transmission means.

As shown in FIG. 1 to FIG. 10, the player main body 6 is of a shell shape in which a terrace-type protruding section 6a is provided in one part of the circumference of a disk body. A disk chassis section 7 which comprises a circular recess is provided on the upper surface of the player main body 6. The disk chassis section 7 is configured to be opened and closed by an open/close cover 8 of a similar shell shape. Moreover, a buckle 9 which locks the open/close cover 8 in a closed state is provided on the player main body 6.

Figure 10:
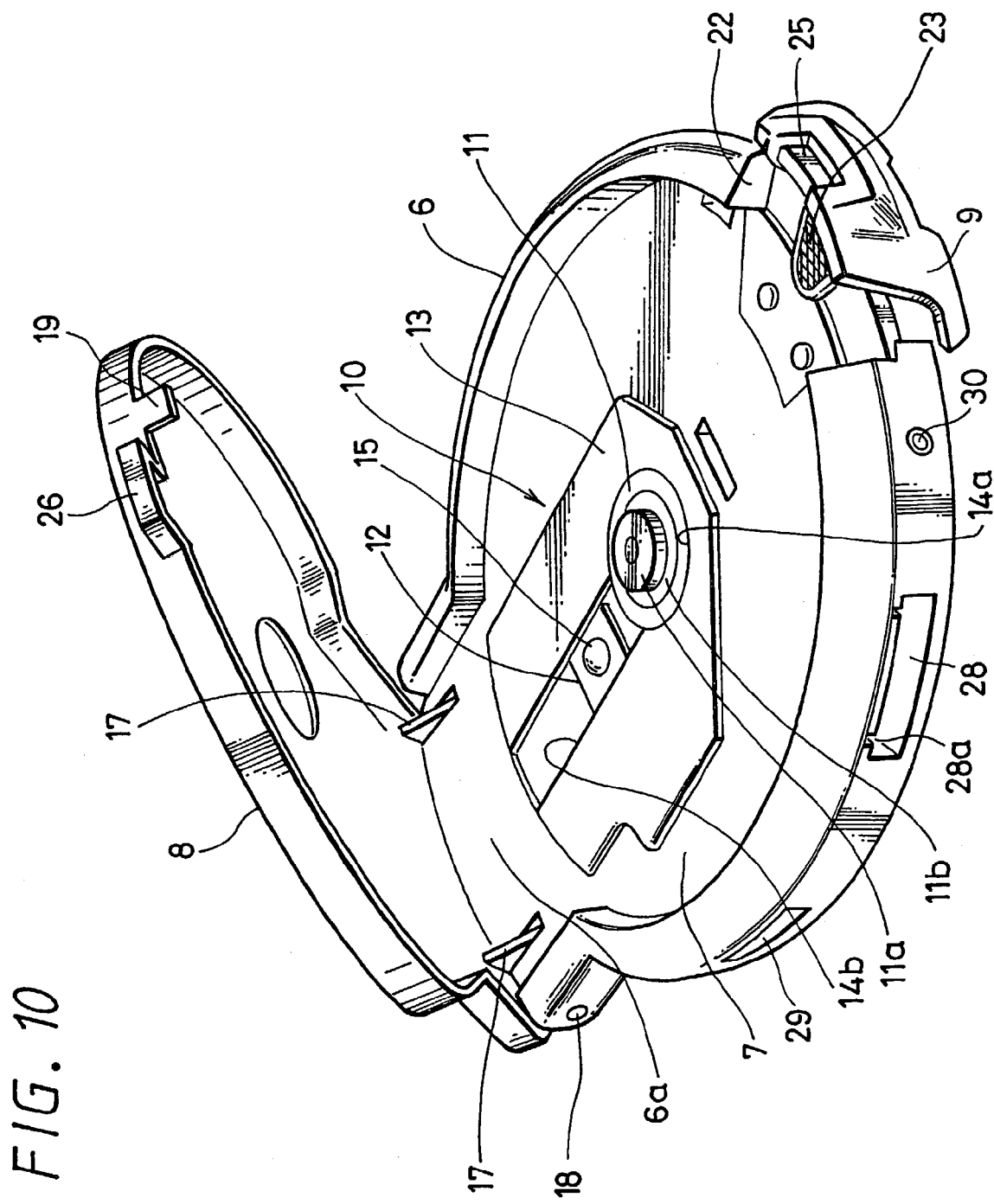
FIG. 10 is a perspective view of an open/close cover of the player main body of the DVD player shown in FIG. 2 while the above cover is opened.

As shown in FIG. 10, a disk drive device 10 which is elastically supported by the player main body 6 is disposed in the disk chassis section 7 of the player main body 6. The disk drive device 10 is configured to comprise a turntable 11 disposed in the center of the disk chassis section 7, and an optical pickup device 12 which executes one or both of reproduction (read) and recording (write) of an information signal from and on an information storage surface of an optical disk, which is attached on the turntable 11, such as DVD and CD (compact disk) which represents one concrete example of a disk-type storage medium.

Though not shown in the figure, the turntable 11 is fitted on a rotation section of a spindle motor which is fixed to a chassis at the fixed section. Furthermore, the optical pickup device 12 is slidably supported by a pair of guide shafts which are fixed to the chassis. The pair of guide shafts are configured to be disposed parallel to each other with a predetermined distance in-between. Front end sections thereof are disposed so as to sandwich the spindle motor, and rear ends thereof are extended backward.

The upper surface of the disk drive device 10 is covered with a cover plate 13. A circular central hole 14a, and an opening section 14b which has a long hole shape, and continuously extending backward from the circular central hole 14a are provided on the cover plate 13. Then, the turntable 11 is protruded upward from the central hole 14a, and an optical head of the optical pickup device 12 is inserted to the opening section 14b. An object lens 15 of the optical head is configured to face the information storage surface of the optical disk attached on the turntable 11.

The turntable 11 has an engagement section 11a which engages with the center hole of the optical disk, and a mounting section 11b which is formed integrally with the engagement section 11a and, at the same time, on which a periphery section of the central hole of the optical disk is mounted. A plurality of engagement pawls are circumferentially provided at approximately equal intervals in the engagement section 11a of the turntable 11. Each engagement pawl is configured to be movable in the radial direction of the mounting section 11b, and to be urged outward in the radial direction by springs at any time.

The engagement section 11a may engage with the center hole of the optical disk by moving the engagement pawls backward against the spring forces of the springs. In such an engagement state, each of the engagement pawls fixedly engages with the periphery section of the central hole by the spring forces of the springs. As a result, the optical disk is chucked by the turntable 11 and is driven to rotate integrally with the turntable 11.

The open/close cover 8 which is overlapped on the upper surface of the player main body 6 comprises a protruding section 8a corresponding to the protruding section 6a of the player main body 6, and a side section 8b protruding continuously from the peripheral edge of the protruding section 8a toward the lower surface side. In addition, a pair of L-shaped arm pieces 17 and 17, which are protruding toward the lower surface side, are provided on the protruding section 8a of the open/close cover 8. Each arm pieces 17 are inserted into the inside of the player main body 6 while passing through the protruding section 8a, and the tip section is rotatably supported by a supporting shaft 18.

The supporting shaft 18 is supported at its both ends by the side of the protruding section 6a of the player main body 6, and the open/close cover 8 may perform looking-upward and looking-downward operation with the supporting shaft 18 as the center of rotation.

Accordingly, the disk chassis section 7 is completely closed by the open/close cover 8 by pressing down the open/close cover 8, and by overlapping the cover 8 on the player main body 6. At this juncture, a cover open/close switch is operated by a cover open/close detection piece 19 provided in the open/close cover 8 to detect whether the open/close cover 8 is closed. The cover open/close detection piece 19 is disposed on the free end side (the other side of the arm piece 17) of the side section 8b of the open/close cover 8. A detection hole 20 for the open/close cover as corresponds to the cover open/close detection piece 19 is provided in the disk chassis section 7 of the player main body 6. The cover open/close switch is disposed inside the detection hole 20.

Though not shown, a cover-posture maintaining mechanism which may maintain the posture of the open/close cover 8 at an arbitrary open/close angle is provided in the player main body 6, relating to one of the arm pieces 17 of the open/close cover 8. The cover-posture maintaining mechanism may smoothly perform open/close operation of the open/close cover 8 with a predetermined force by giving a predetermined frictional force in accordance with rotating operation of the open/close cover 8 and, at the same time, the open/close angle may be maintained at an arbitrary open/close position. As such a cover-posture maintaining mechanism, for example, a friction sliding mechanism, a damper device or the like, which may generate a frictional force of a suitable magnitude between the arm piece 17 and a member of the player body 6, may be adapted.

Figure 11:
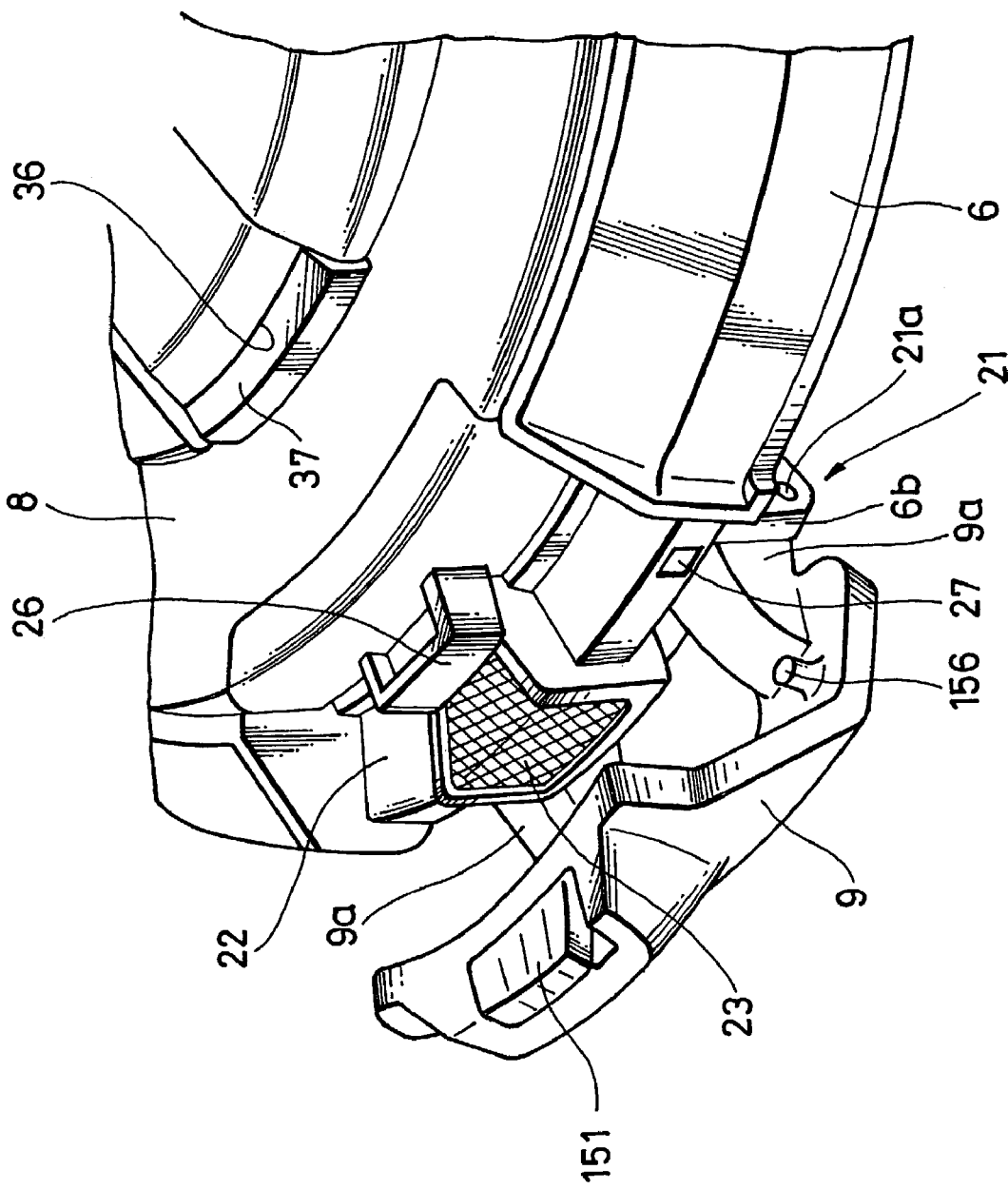
FIG. 11 is a perspective view of an essential part of a buckle part of the player main body shown in FIG. 10 while the buckle part is enlarged and seen from the right side.
Figure 12:
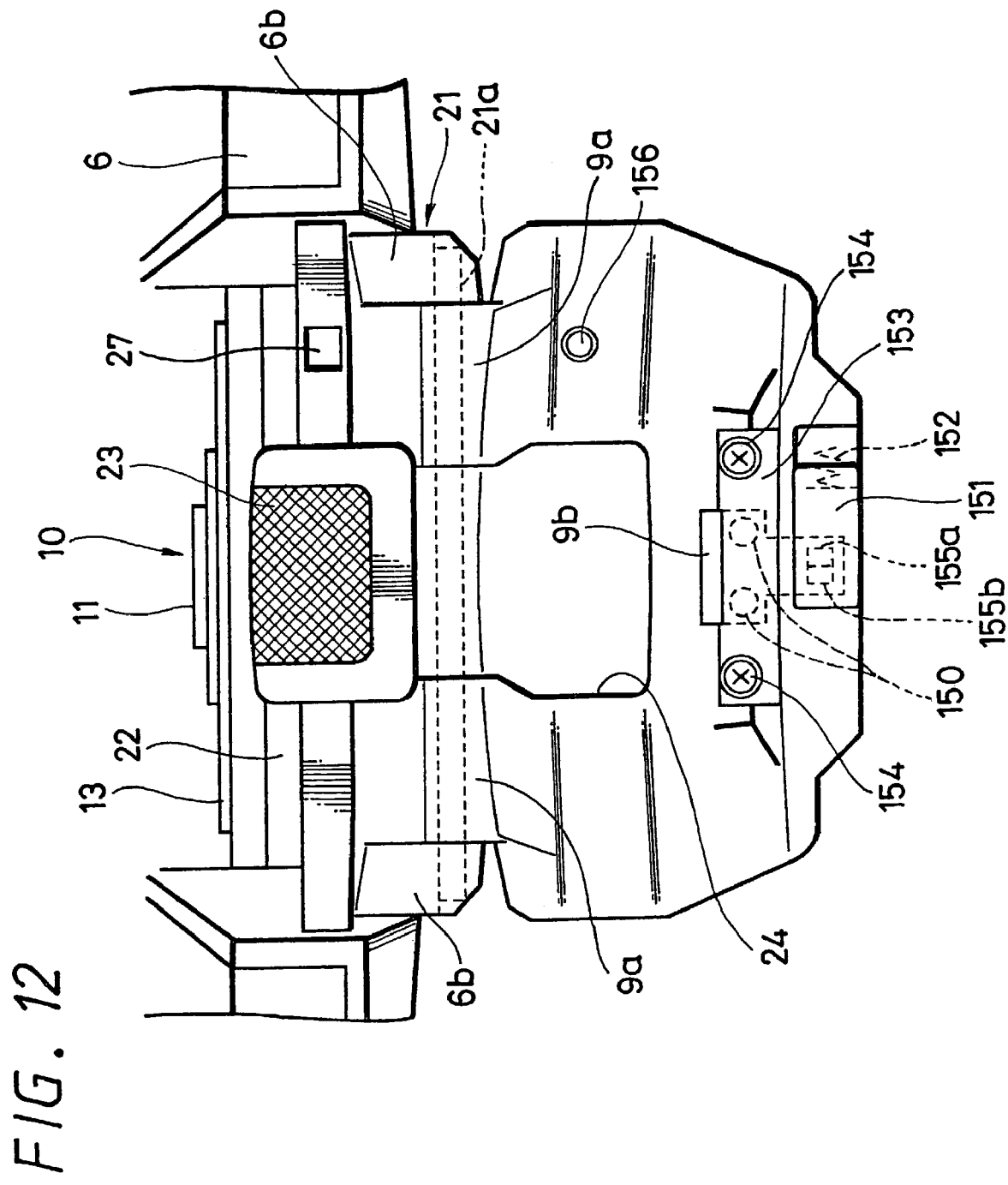
FIG. 12 is a perspective view of an essential part of the buckle part of the player main body shown in FIG. 10 while the buckle part is enlarged and seen from the upper side.

Moreover, the buckle 9 is rotatably fitted on a front surface section on the opposite side of the protruding section 6a in the player main body 6. As shown in FIG. 11 and FIG. 12 the buckle 9 has a shape that conforms to the shape of the side surface of the player main body 6 such that the buckle 9 may be attached on the side section of the player main body 6, and is hinge-joined to the player main body 6 on one side of the width direction perpendicular to the circumferential direction.

That is, shaft receivers 9a are provided on one side of the width direction of the buckle 9, and are inserted between a pair of shaft-receiving convex sections 6b and 6b of the player main body 6. A hinge section 21 is formed by passing a rotating shaft 21a through the pair of shaft-receiving convex sections 6b and 6b and the shaft receiving sections 9a. A notch section 22 to which the free end side of the buckle 9 is detachably attached is provided on the upper surface, which is on the opposite side of the hinge section 21, of the player main body 6.

An opening window 24 is provided approximately in the center part of the buckle 9. Into the opening window 24 is inserted a beam receiving section 23 of the remote control device which will be described later and is provided approximately in the center part of the notch section 22 of the player main body 6. The beam receiving section 23 is configured to have beam receiving surfaces on two surfaces of the front and the upper surface of the player main body 6, and the beam receiving surface on the front is exposed through the opening window 24.

Furthermore, an engagement body 9b which engages with and holds the open/close cover 8 is provided in the buckle 9 to be capable of advancing and retreating by a advance/retreat movement mechanism. The advance/retreat movement mechanism comprises: a spring 150 which urges the engagement body 9b outward at any time; a sliding member 151 which advances and retreats the engagement body 9b against the spring force of the spring 150; a spring member 152 which urges the sliding member 151 in the retreating direction; a holder 153 which holds the above members; a plurality of fitting screws 154 which fits the holder 153 to the inside of the buckle 9, and the like. And, cam sections 155a and 155b which are protruding in directions opposite to each other are provided in the engagement body 9b and the sliding member 151.

An engagement receiving section 26 with which the engagement body 9b engages in a detachable manner is provided, corresponding to the engagement body 9b of the buckle 9, approximately in the center part on the free end side of the of the open/close cover 8. The engagement receiving section 26 of the open/close cover 8 is inserted approximately into the center part of the notch section 22 when the disk chassis section 7 is in a state of being closed. The tip of the engagement receiving section 26 and that of the engagement body 9b of the buckle 9 contact each other at a time of the open/close cover 8 being overlapped on the player main body 6. Then, the engagement body 9b is so configured as to retreat against the spring force of the spring 150 as the buckle 9 is being pressed down, and to climb over the tip section of the engagement receiving section 26. Thereafter, by engaging the engagement body 9b with the engagement receiving section 26 the open/close cover 8 is firmly tightened and locked by the buckle 9.

Thus, by sliding the sliding member 151 to the right side in FIG. 12 against the spring force of the spring member 152, the cam section 155b provided in the sliding member 151 makes the cam section 155a provided in the engagement body 9b retreat. Thereby, the engagement body 9b retreats from the surface of the holder 153 to the inside thereof, and the engagement of the engagement body 9b with the engagement receiving section 26 of the open/close cover 8 is released.

Subsequently, when the sliding member 151 is let go, the spring force of the spring member 152 slides the sliding member 151 to the left side. Thereby, the engagement body 9b is reverted to the original state by the spring force of the spring 150, and is protruded, as the cam section 155b is separated from the cam section 155a.

The state in which the open/close cover 8 is locked by the buckle 9 can be simply released by the following two modes. A first lock-releasing operation is to slide the sliding member 151 in the circumferential direction. At this time, the engagement body 9b retreats against the spring force of the spring 150 by sliding the sliding member 151 in the lateral direction. Thereby, the engagement of the engagement receiving section 26 by the engagement body 9b is released.

As a result, the buckle 9 can be pulled up, and the engagement body 9b is separated wide apart from the engagement receiving section 26 by the pull-up operation so that the pull-up operation of the open/close cover 8 becomes possible. In such a case, the pull-up operation of the buckle 9 may be easily and smoothly performed with a small force.

Moreover, a second lock-releasing operation of a locked state of the open/close cover 8 is to directly pull the buckle 9 up without the sliding operation of the sliding member 151. In such a case, as the spring force of the spring 150, that of the spring member 152, and the movement of the sliding member 151 become a resisting force when the buckle 9 is pulled up, a pull-up force larger than that of the first lock-releasing operation is required. However, the pull-up operation of the buckle 9 may be executed in a comparatively simple manner by adequately setting the values for the spring forces of the spring 150 and the spring member 152.

In order to detect the open/close operation of the buckle 9, an open/close protrusion 156 is provided on the inner side of the buckle 9. A buckle detection hole 27 is provided, corresponding to the open/close protrusion 156, on the front surface of the notch section 22 of the player main body 6. A buckle open/close switch which is a second detector for detecting the open/close operation of the buckle 9 is disposed inside the detection hole 27. At this time, 27 by completely putting the buckle 9 in place and by locking the open/close cover 8 the open/close protrusion 156 is inserted into the detection hole. As a result, the buckle open/close switch is operated by the open/close protrusion 156, and the locked state of the buckle 9 is detected.

In addition, as shown in FIG. 1 and the like, a first socket section 28, a second socket 29 and an earphone jack 30; display lamps such as a charge lamp 31a, and a power supply lamp 31b; and operation means 32 such as a reproducing button, and a volume switch are provided on the side section of the player main body 6. The first and second socket sections 28, 29 and the earphone jack 30 are disposed on the left side section of the player main body 6, and the display lamps and the operation means 32 are disposed on the right side section of the player main body 6.

The battery chassis body 3 is detachably attached as a power supply device in the player main body 6 which has such a configuration. The battery chassis body 3 comprises a first battery case 34 and a second battery case 35, and the both cases 34 and 35 are rotatably connected to each other The battery cases 34 and 35 are configured to comprise respectively flat rectangular containers, wherein the plane shapes have been made approximately similar shapes, and the lower battery case 35 as the second battery case is longer than the upper battery case 34 as the first battery case in the longitudinal direction. And, the widths of the both battery cases 34 and 35 are a little bit wider than those of the protruding section 6a of the player main body 6 and the protruding section 8a of the open/close cover 8.

Figure 2:
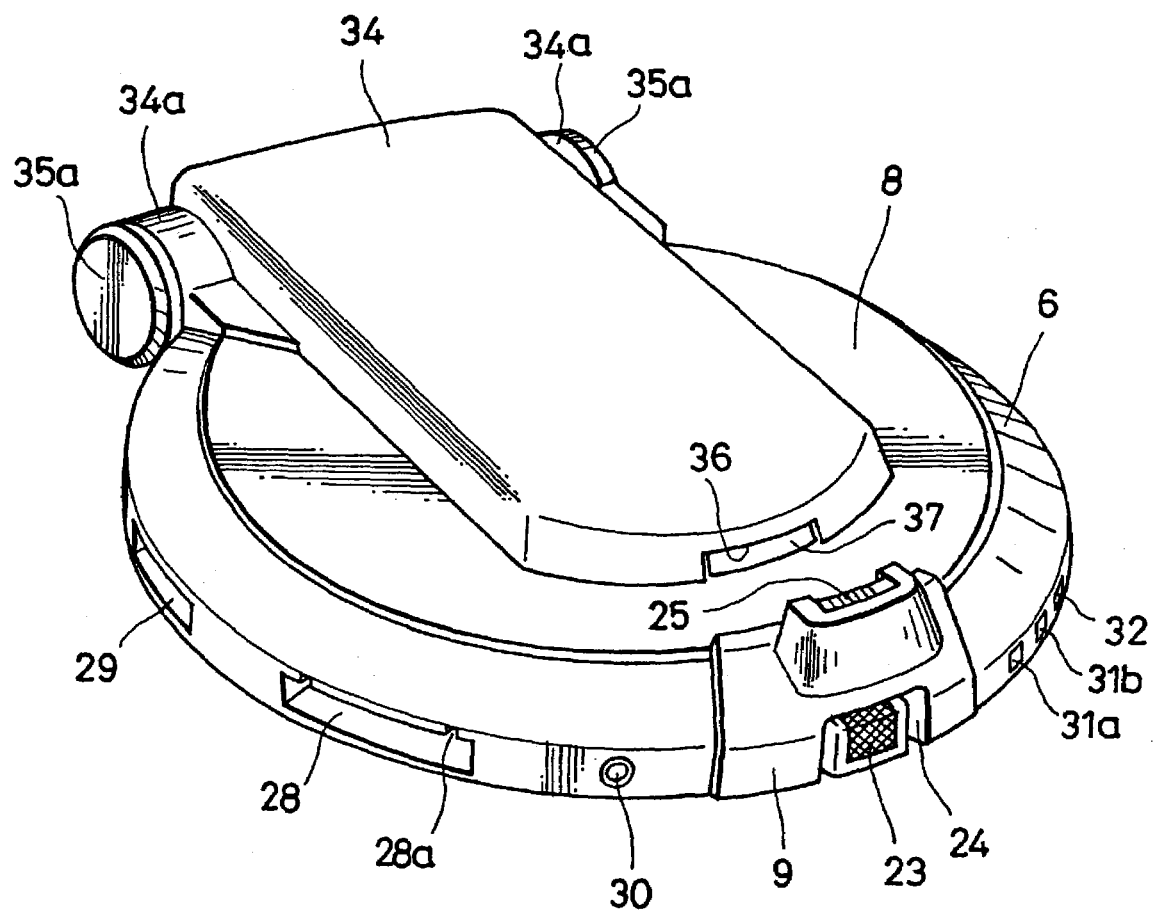
FIG. 2 is an outside perspective view of a DVD player showing an embodiment of an electronic device which is provided with a control device comprising the display device according to the present invention.
Figure 3:
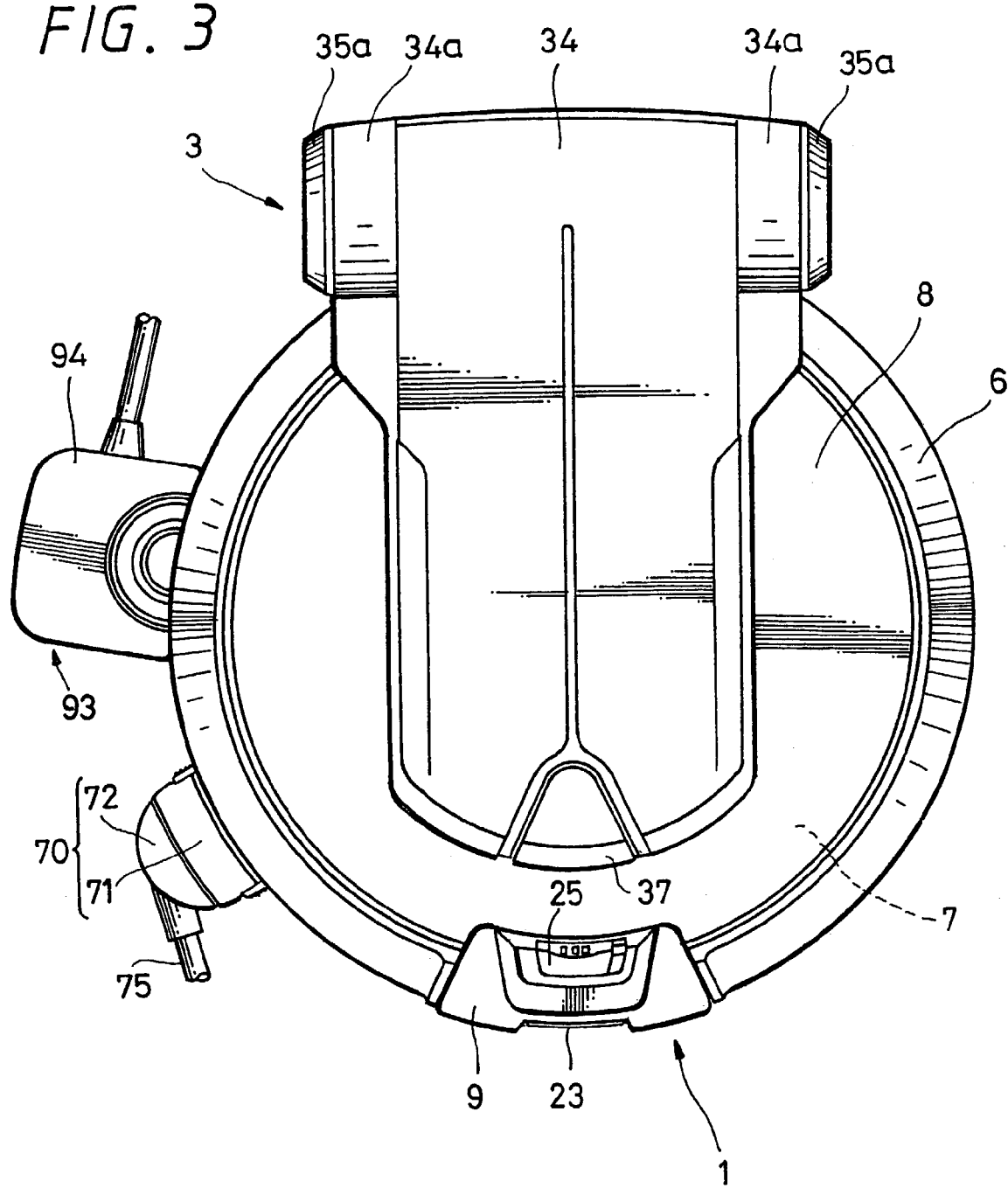
FIG. 3 is a plan view of the DVD player shown in FIG. 2.

As shown in FIG. 2, connection sections 34a, 35a which are outwardly protruding to both sides in the width direction are provided at one end, in the longitudinal direction, of each battery cases 34 and 35. The upper and lower battery cases 34 and 35 are integrally configured to be capable of rotating by connecting the connection sections 34a, 35a to each other. Connection means of the battery chassis body 3 makes it possible for the upper and lower battery cases 34 and 35 to choose either a closed state in which the above cases are approximately parallel to each other with a predetermined gap in the vertical direction or an open state in which the upper battery case 34 are inclined to the lower battery case 35 by an arbitrary angle (for example, 45 degrees and 60 degrees).

The predetermined gap between the upper and lower battery cases 34 and 35 amounts to the thickness of the player main body 6, and the player main body 6 is inserted between the upper and lower battery cases 34 and 35. In order to position the player main body 6 which has been inserted as described above, an engagement concave/convex section 36 is provided at the tip section of the upper battery case 34. A hook section 37 with a L-shape cross section is provided in the open/close cover 8, corresponding to the engagement concave/convex section 36. The hook section 37 is set up in the neighborhood of the engagement receiving section 26 in the open/close cover 8. By engagement of the engagement concave/convex section 36 with the hook section 37, positioning of the upper battery case 34 in the open/close cover 8, and joining of the open/close cover 8 and the upper battery case 34 together may be simultaneously executed.

Moreover, a fixing screw 38 is rotatably fitted in the lower battery case 38. The fixing screw 38 is disposed at a position corresponding to the protruding section 6a of the player main body 6 in the lower battery case 35. A tapped hole is provided on the back of the player main body 6, corresponding to the fixing screw 38, and the lower battery case 35 is fixed to the player main body 6 by screwing together the fixing screw 38 and the tapped hole.

When the lower battery case 35 is in a state of being fixed, the upper battery case 34 is integrally rotated with the open/close cover 8. That is, the open/close cover 8 can freely open and close the disk chassis section 7 while the upper battery case 34 is in a state of being in place. An appropriate number of rechargeable second batteries 40 are held in the upper battery case 34.

Moreover, an appropriate number of rechargeable second batteries 40 and a safety circuit 41 are held in the lower battery case 35. The safety circuit 41 is connected to a connector 42. The connector 42 is integrally provided on the rear surface section of the lower battery case 35. A plug 43 which is connected to the connector 42 is integrally provided on the rear surface section of the player main body 6. Accordingly, the connector 42 and the plug 43 are automatically connected by putting in place the battery chassis body 3 in the player main body 6, and electric power is automatically supplied from the battery chassis body 3 to the player main body 6.

As materials for the player main body 6, the open/close cover 8, the buckle 9 and the upper and lower battery cases 34 and 35 configured as described above, for example, plastic such as ABS (acrylonitrile butadiene styrene resin), a POM (polyacetal resin) and other engineering plastic may be adapted. Moreover, aluminum alloys and other metals may be used for the materials.

Furthermore, the control device 2 has a configuration shown in FIG. 1, FIGS. 14A to 14C, and the like. That is, the control device 2 is configured to comprise: a cabinet 50 as a display device main body; a liquid crystal display 51 which shows one concrete example of a display section; a cover body 52 which opens and closes the display surface of the liquid crystal display 51; an operation section 53 which includes various types of switching means, adjusting means, and the like.

The cabinet 50 comprises a hollow chassis having an approximately quadrilateral shape, and an opening window 54 is a little bit offset to one side in the longitudinal direction which is a lateral direction. Further, on the other side of the longitudinal direction of the cabinet 50a, plurality of openings (three holes in the present embodiment) 55a, 55b and 55c are provided at predetermined intervals in the width direction. And, the liquid crystal display 51 is fitted into the opening window 54, and various kinds of operation buttons in the operation section 53 are inserted into a plurality of openings 55a to 55c, respectively.

An operation button 56a as a basic operation switch by which basic operation such as reproduction, fast-forwarding, and rewinding is executed is attached in the first opening 55a which is located at the upper part. With regard to the operation button 56a, on/off operation of reproduction may be realized, for example, by pressing the center part of the button 56a. And, fast-forwarding or rewinding operation may be selectively executed by pressing one side of the both sides.

Moreover, a selection button 56b as a mode selection switch by which mode selection and decision may be executed is attached in the second opening 55b which is located at the center. With regard to the selection button 56b, one of various kinds of modes may be selected, for example, by pressing one part of four parts which are located at the upper, lower, right, and left parts of the button 56b, and the selected mode may be decided by pressing the center part of the button 56b after the selection. In addition, a power supply button 56c as a power supply switch is attached in the third opening 55c which is located at the lower part. On/off of the power supply is executed by sliding the power supply button 56c in the lateral direction.

Furthermore, a long hole 55d which is extended in the width direction is provided on the side surface of the cabinet 50 at the side of the openings 55a to 55c. Two adjusting buttons 56d and 56e as volume switches for volume adjusting is attached in the long hole 55d. One adjusting button 56d turns up the volume, and the other adjusting button 56e turns down the volume.

Figure 15:
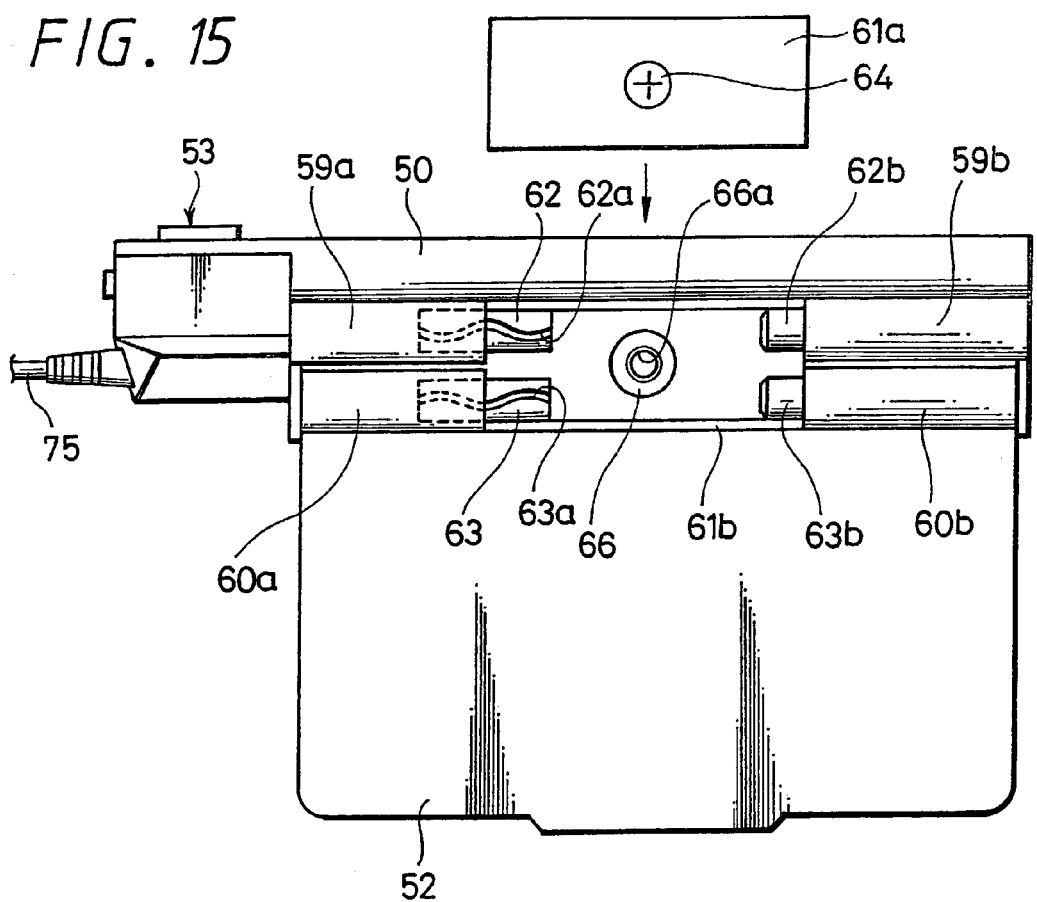
FIG. 15 is a plan view of a cover body which is opened in the display device shown in FIG. 14.

As shown in FIG. 1 and FIG. 15, and the like, a connection section 58 of the cover body 52 is provided on the upper surface of the cabinet 50. The connection section 58 comprises: protruding rails 59a and 59b which are provided on the upper surface of the cabinet 50; protruding rails 60a, 60b which are provided on the upper surface of the cover body 52; a connection block 61 which is located between the protruding rails 59a and 59b, and between the protruding rails 60a and 60b, two spring pins 62 and 63, which represent one concrete example of resisting means; and the like.

Two sets of the protruding rails 59a and 60a, and 59b and 60b have similar shapes and configurations, and the strips of each set are disposed on the same shaft center lines, with predetermined spaces in-between, respectively. One end of each spring pin 62 and 63 in the axial direction is press-fit into one internal end face of each protruding rail 59a, 60a, respectively.

As shown in FIG. 14C on an enlarged scale, the spring pins 62 and 63 are formed by providing slits 62a and 63a in metal cylindrical tubes. Each slit 62a and 63a of the spring pins 62 and 63 is continuously provided from one end to the other end of the cylindrical tubes, so that elasticity may wholly be imparted by making it possible for the diameter thereof to be elastically reduced by the amounts of the widths of the slits 62a and 63a.

Here, the shapes of the slits 62a and 63a of the spring pins 62 and 63 are not limited to a wavelike shape shown in a figure according to the present embodiment, and may be formed to other shapes such as a straight line one, a curved line one, a saw-toothed one, or a horny one. As a material of the spring pins 62 and 63, metals such as spring steel or stainless steel may be preferable, but engineering plastic may also be adapted.

Convex shaft sections 62b, 63b which are respectively protruding toward the spring pins 62 and 63 are each provided on one end face inside each of protruding rail 59b, 60b. The diameters of the respective convex shaft section 62b, 63b are set to approximately similar amounts of the outer diameters of the spring pins 62 and 63, respectively. The two convex shaft sections 62b, 63b, and the protruding sections of the spring pins 62 and 63 are covered by the connection block 61.

Figure 16:
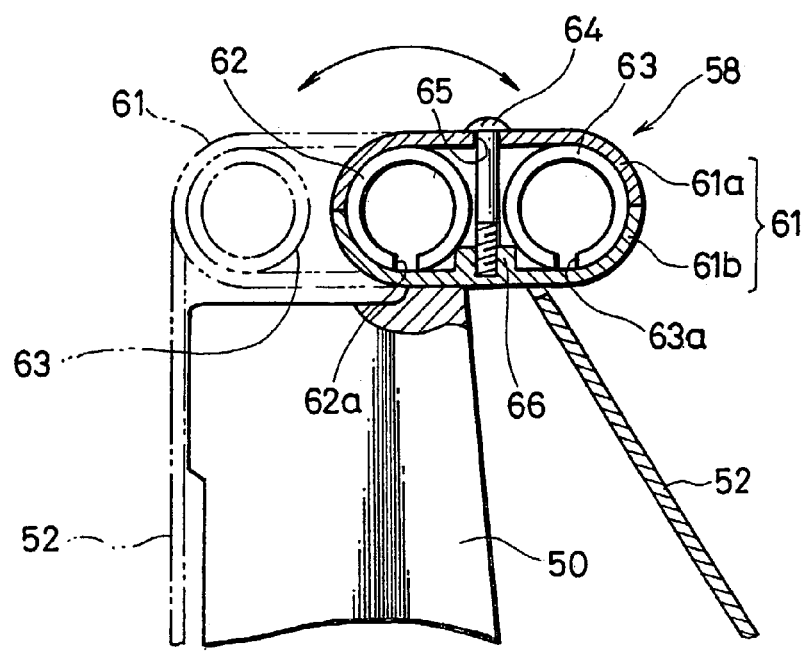
FIG. 16 is an explanatory diagram showing an essential part of a cross-sectioned central part of a display device main body in the display device shown in FIG. 15.

As shown in FIG. 16, the connection block 61 is formed by a combination of a first block 61a and a second block 61b which are formed like gutters, and a fixing screw 64 which tightens and fixes both the blocks 61a, 61b. A through hole 65 is provided approximately at the center part of the first block 61a, and a boss section 66 is disposed approximately at the center part of the inner surface of the second block 61b. Moreover, a tapped hole 66a into which a screw section of the fixing screw 64 is screwed is provided at the boss section 66.

The second block 61b is applied against one side of the protruding sections of the two spring pins 62 and 63 and the two convex shaft sections 62b, 63b, and the first block 61a covers the other side of them. Thereafter, the fixing screw 64 is passed through both the blocks 61a, 61b, and the screw section thereof is screwed into the tapped hole 66a of the boss section 66 to thereby tighten the both blocks.

Thereby, the cabinet 50 and the cover body 52 are rotatably connected through the connection block 61 by the connection section 58 which has hinged structures at two locations. In such a case, the amounts of reduction in the diameters of the spring pins 62 and 63 may be adjusted by adjusting the tightening force of the fixing screw 64. As a result, frictional forces which are generated between the connection block 61 and the spring pins 62 and 63 may be changed upwardly or downwardly by changing the diameters of the spring pins 62 and 63. Thereby, operation forces at a time of the cover body 52 in operation may be adequately adjusted to appropriate values by changing the frictional forces when the cover body 52 is opened or closed.

Moreover, the cover body 52 comprises a plate body the size of which may cover approximately all over the display surface including the liquid crystal display 51 of the cabinet 50. The above-described protruding rails 60a, 60b are integrally provided at the upper edge of the cover body 52. The cover body 52 and the cabinet 50 are rotatably connected by the connection section 58 which has the hinged structures at two locations.

Accordingly, the cover body 52 may be rotated by a maximum angle of approximately 360 degrees to the liquid crystal display 51 which is a display surface. Then, by making the cover body 52 move to the backside by rotating by an angle of approximately 360 degrees the cover body 52 itself may be used, for example, for a function such as a stand of the cabinet 50.

A first rotating shaft which is parallel to the display section is formed by the above first spring pin 62 and convex shaft section 62b of the cabinet 50. The cabinet 50 and the connection block 61 is connected such that they can be rotated around the first rotating shaft. And, a second rotating shaft is formed by the second spring pin 63 and the convex shaft section 63b of the cover body 52. The second rotating shaft is parallel to the first rotating shaft, and the cover body 52 and the connection block 61 is connected such that they can be rotated around the second rotating shaft. The cover body 52 may be fixed at an arbitrary position on each rotating shaft by a frictional force which is generated between the connection block 61 and the spring pin 62 or 63.

Engineering plastic such as ABS, and POM may be applied for materials of the cabinet 50, the cover body 52, and the connection block 61 of the above-described connection block 61. But, the materials are not limited to the above plastic, and aluminum alloys or other metals may be used as the materials.

As shown in FIG. 1, one end of a first connection cable 4 which connects the control device 2 to the player main body 6 is fixedly connected to the lower part at the side of the operation section 53 in the cabinet 50. A first plug 70 for connection to the player main body 6 is integrally fixed to the other end of the connection cable 4.

The first plug 70 comprises a plug main body 71 which includes a hollow body with a quadrilateral section, a cap body 72 of a semicircular shape which is joined to the backside of the plug main body 71, a terminal cover 73 which is protruding from the tip side of the plug main body 71, and the like. The cap body 72 is formed to become thinner in the width at the tip side. Protruding guide rails 74 which regulate the inserting direction when the cap body 72 are inserted into the first socket section 28 of the player main body 6 are provided at two positions on one surface, which has a thinner width, of the cap body 72. A pair of guide grooves 28a which are slidably fitted to the protruding guide rails 74 are provided, corresponding to the above guide rails 74, in the first socket section 28.

In addition, an erroneous insertion prevention convex section 74a that protrudes forward in an arc-shape is provided at the tip section of one surface on the wide side of the plug main body 71. At the tip section on the wide side of the plug main body 71 there is provided an erroneous insertion prevention concave section having an arc-shape notch that opens at the tip edge to thereby be symmetric with this 74a.

As described above, by providing the concave section and convex section for preventing the erroneous insertion into the tip section on the insertion side of the plug main body 71 the possibility that a lot of terminals which are disposed in the terminal cover 73 might be damaged due to an erroneous insertion of the first plug 70 may be eliminated. Moreover, by providing a pair of protruding guide rails 74 and 74 in the plug main body 71, the possibility that terminals in the terminal cover 73 might be damaged due to external-forces with which to twistingly pull out the first plug 70 in the extracting direction is eliminated.

The terminal cover 73 of the first plug 70 comprises a slender frame body with a quadrilateral section. A lot of terminals are disposed in a row (arrangement in a plurality of lines is acceptable) along the longitudinal direction in the above cover. And, one end of a pipe-shape sheath member 75, which is diagonally and sideways extending, is connected to the rear part of the cap body 72. A lot of wire rods are passed through the sheath member 75.

As described above, by assuming that the pulling-out direction of the wire rods is set to the diagonally sideways direction, the leading direction of the connection cable 4 may be regulated so that the above leading direction be approximately in the same direction with the longitudinal direction of the battery chassis body 3. As a result, loads which are applied by the connection cable 4 to the connection section of the first plug 70 may be reduced, and occurrences of troubles such as a short circuit and breaking of wire may be restrained. Here, the plug main body 71 of the first plug 70 is inserted into the root parts of the protruding guide rails 74.

And, a second plug 77 which is provided at one end of the second connection cable 5 in order to connect the player main body to other electronic devices is detachably attached in the second socket 29. The second plug 77 has a terminal cover 78 which is protruding from the tip section at the plug inserting side. The terminal cover 78 comprises a slender frame body with a quadrilateral section. A lot of terminals are disposed in a row (arrangement in a plurality of lines is acceptable) along the longitudinal direction in the above cover 78.

One end of a wire rod 79 is connected to the back surface of the second plug 77, and the other end of the wire rod 79 is connected to a connector 80. The connector 80 connects the player main body 6 to other electronic devices (for example, a television set). The second connection cable 5 is comprised of the second plug 77, the wire rod 79 and the connector 80.

The connector 80 comprises a hollow chassis of a flat shape, and the wire rod 79 is connected to the side surface of one end. A plurality of terminals 81 are disposed in a line on the other end surface of the connector 80. For example, a video terminal, an S1 video terminal and right and left audio terminals, may be listed as the above terminals 81.

An electronic device with the above configuration may be used, for example, in the following way. The battery chassis body 3 is integrally attached to the player main body 6 in advance. That is, the protruding section 6a side of the player main body 6 is inserted between the upper battery case 34 and the lower battery case 35 of the battery chassis body 3. Then, the engagement concave/convex section 36 is engaged with the hook section 37 of the open/close cover 8.

Figure 4:
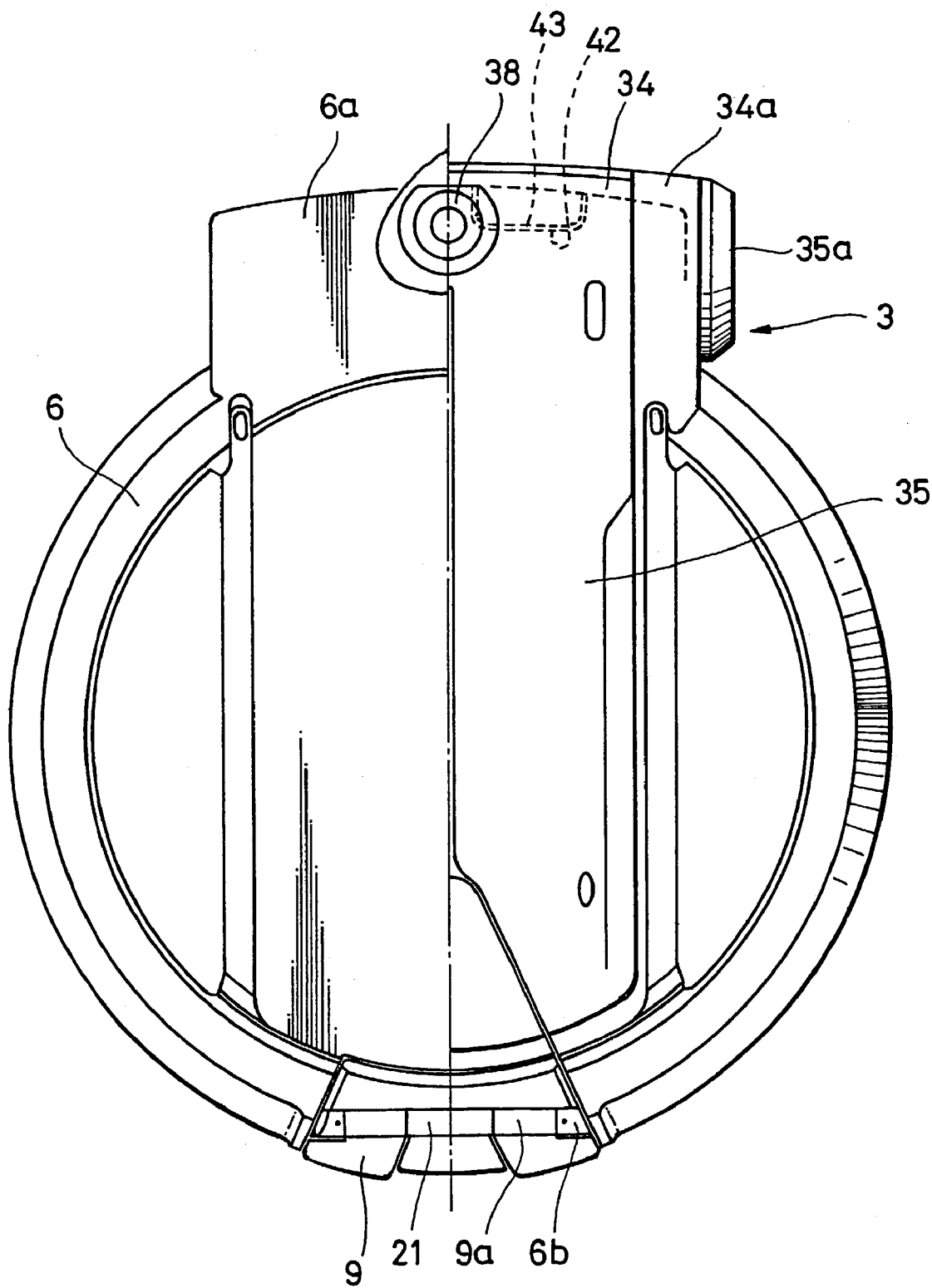
FIG. 4 is a bottom view of a battery chassis body cut in half of the DVD player shown in FIG. 2.
Figure 5:
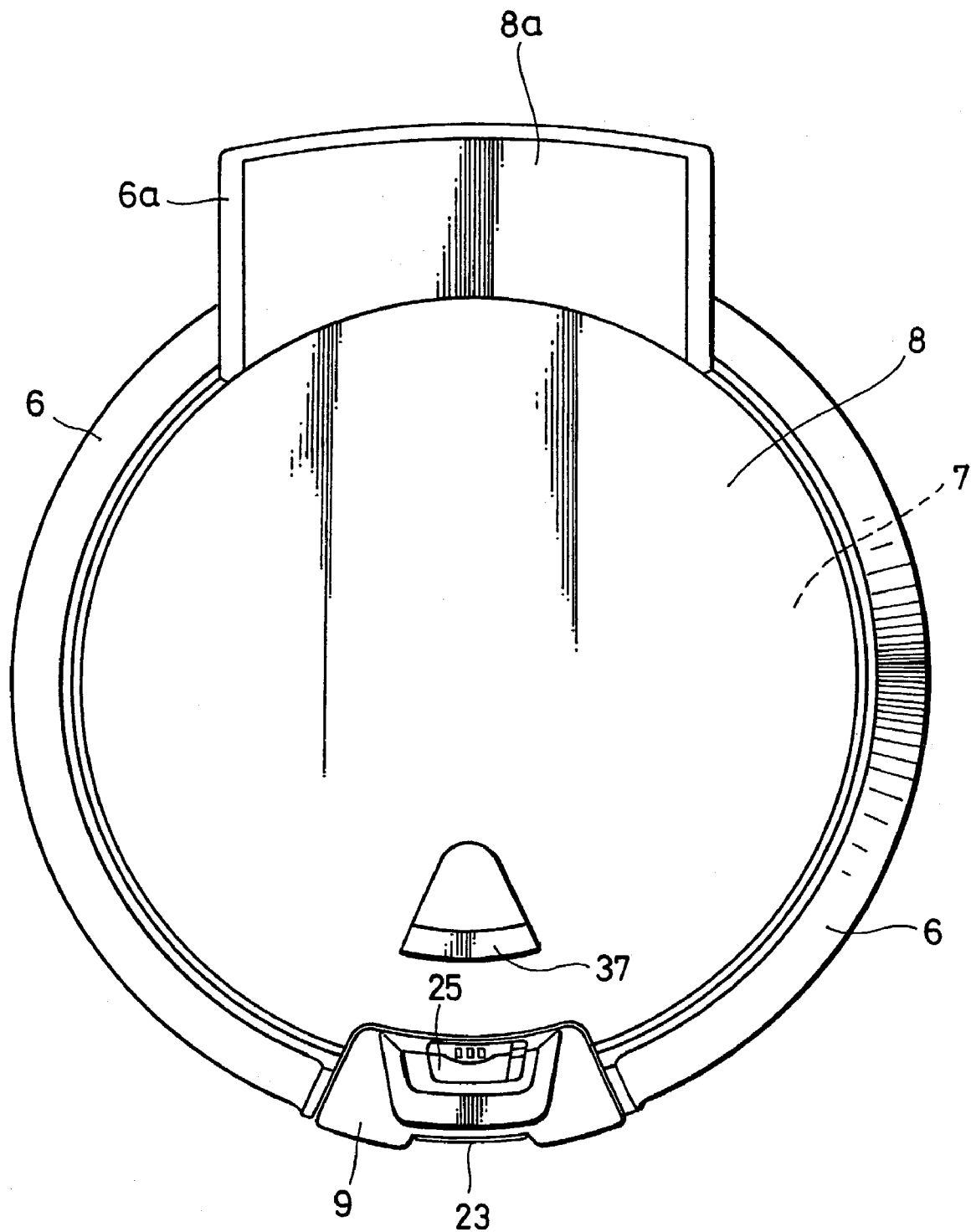
FIG. 5 is a plan view of a player main body of the DVD player shown in FIG. 2.
Figure 6:
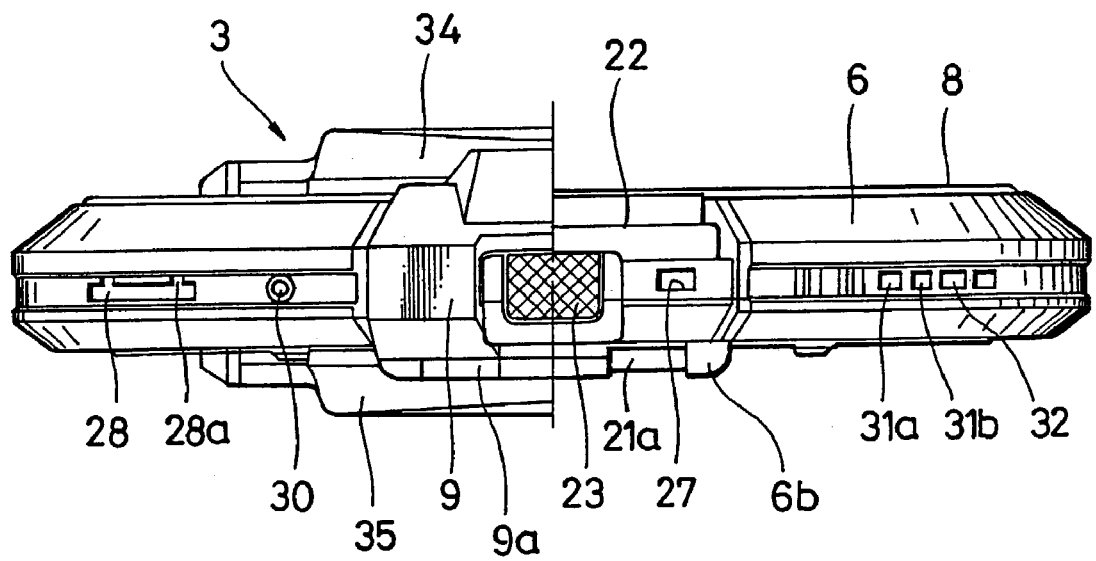
FIG. 6 is a front view of the battery chassis body cut in half of the DVD player shown in FIG. 2.
Figure 7:
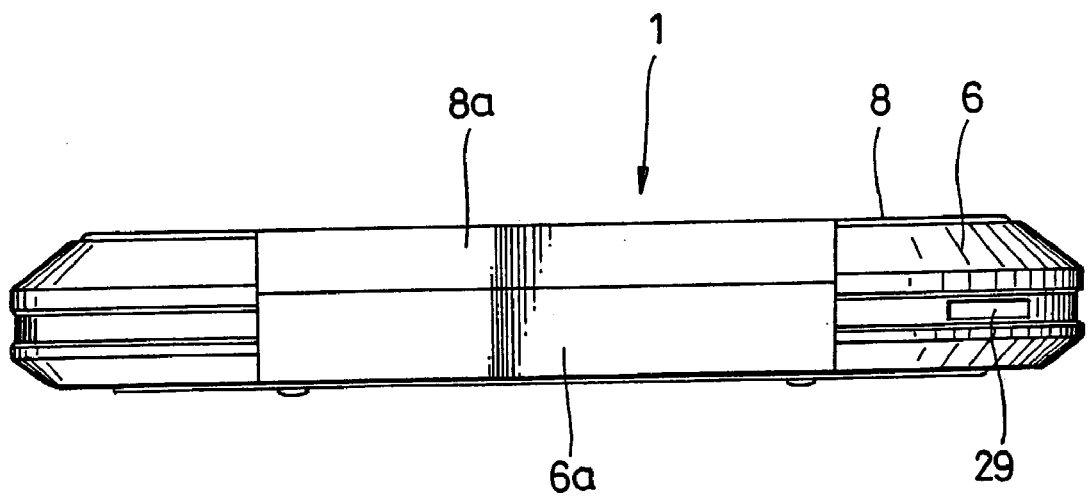
FIG. 7 is a back view of the player main body of the DVD player shown in FIG. 2.
Figure 8:
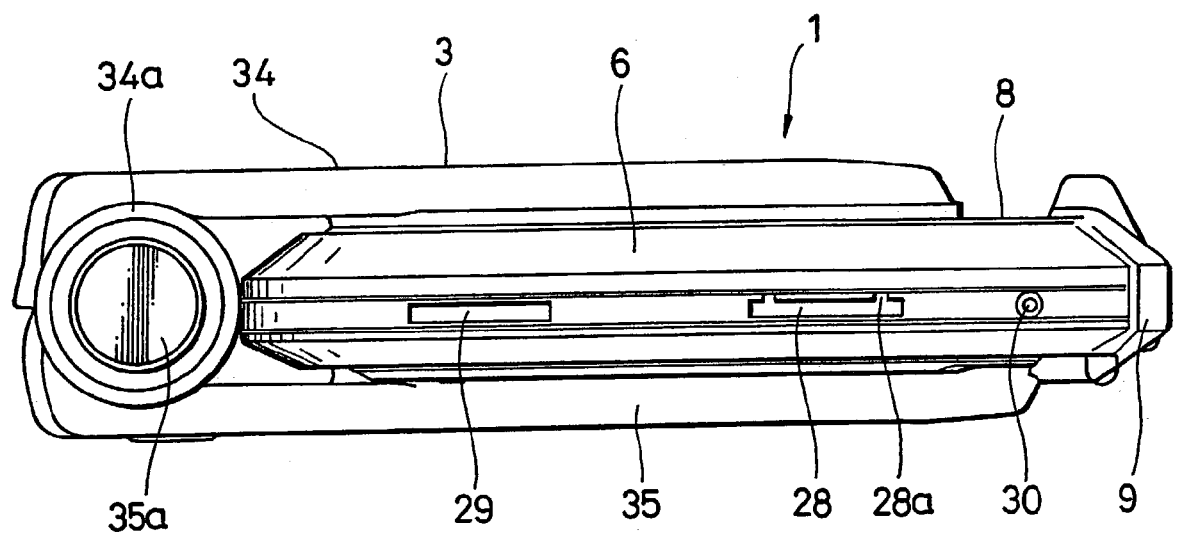
FIG. 8 is a side view of the DVD player shown in FIG. 2.
Figure 9:
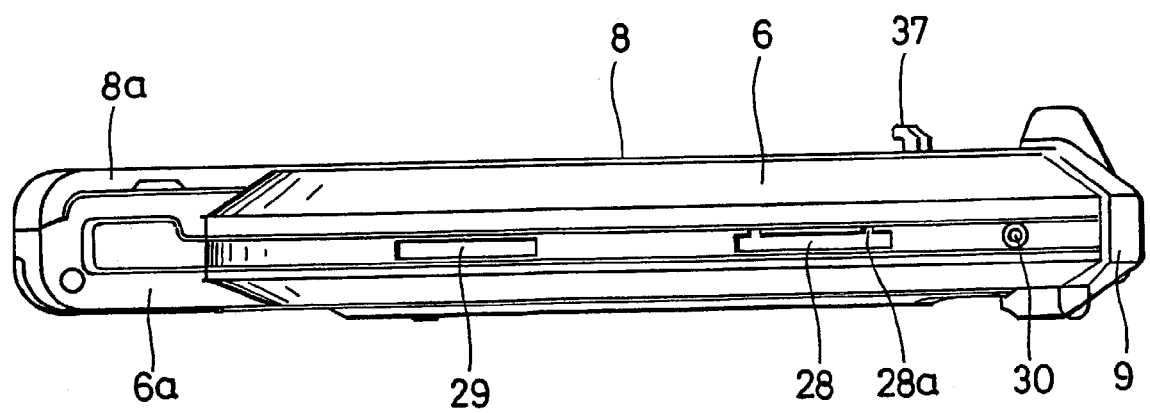
FIG. 9 is a side view of the player main body of the DVD player shown in FIG. 2.

At this time, by inserting the player main body 6 up to a predetermined position, the plug 43 provided in the player main body 6 is engaged with the connector 42 provided in the lower battery case 35, as shown in FIG. 4. Accordingly, the player main body 6 and the battery chassis body 3 are electrically connected to each other. Subsequently, the fixing screw 38 of the lower battery case 35 is screwed into a tapped hole of the player main body 6, and the above case 35 and the main body 6 are tightened. Thereby, the hook-up of the battery chassis body 3 to the player main body 6 is completed.

Then, the first plug 70 of the first connection cable 4 is inserted into the first socket section 28 of the player main body 6, and the control device 2 is connected to the player main body 6 through the first connection cable 4. Thereby, the player main body 6, the battery chassis body 3, and the control device 2 are electrically connected to each other, and the operation of the DVD player 1 becomes possible.

Operation to attach an optical disk in the player main body 6 of the DVD player 1 may be realized, for example, in the following manner. In the first place, the buckle 9 is pulled up, and the locked state of the open/close cover 8 with the buckle 9 is released. That is, hook a finger on and pull up the buckle 9 against the spring force of the spring member 152. Thereby, the buckle 9 is directly pulled up without the sliding operation of the sliding member 151 to realize the unlocking in a simple manner.

In this case, a comparatively large force is required to be applied on the buckle 9, as the spring force of the spring member 152 becomes resistant to the pull-up operation of the buckle 9. In a separate way from this, in order to release the locked state of the buckle 9 with a small force, the slide member 151 is slid to retreat the engagement body 9b to thereby release an engagement by the engagement body 9b with the engagement receiving section 26. Thereby, the locked state of the buckle 9 is released. Accordingly, the buckle 9 may be simply pulled up with a small force by rotating the buckle 9 about the hinge section 21.

Thus, when the buckle 9 is pulled up, the open/close protrusion 156 provided on the inner surface of the buckle 9 is extracted from the detection hole 27 which is provided on the front surface of the player main body 6. Thereby, a detection switch which detects the locked state of the buckle 9 becomes off, and a detection signal is sent to the control device 2.

Then, the engagement receiving section 26 or the like which have been exposed by pulling up the buckle 9 is held, for example, with a fingertip, and the front side of the open/close cover 8 is drawn up to an arbitrary height. Thereby, the disk chassis section 7 which is provided on the upper surface is opened, and the disk drive device 10 is exposed.

At this time, the cover open/close detection piece 19 of the open/close cover 8 is extracted from the detection hole 20 for the cover of the player main body 6. Thereby, a detection switch which detects opening and closing of the open/close cover 8 becomes off, and a detection signal is sent to the control device 2. When an open signal of the open/close cover 8, and the above-described release signal of the buckle 9 are not supplied to the control device 2, that is, when the open/close cover 8 is open, or, when the buckle 9 is open, the disk drive device 10 is never driven.

Here, the upper battery case 34 of the battery chassis body 3 is integrally moved together with the open/close cover 8, and are jumped up together with the open/close cover 8. Thereby, the disk chassis section 7 is opened, and the turntable 11 of the disk drive device 10 is exposed, as shown in FIG. 10. Thereafter, a desired optical disk is attached on the turntable 11, and chucking of the optical disk is executed.

Then, the open/close cover 8 is pushed down together with the upper battery case 34, and the disk chassis section 7 is closed with the open/close cover 8. At this time, by completely closing the open/close cover 8 the cover open/close detection piece 19 is inserted into the cover detection hole 20. Accordingly, the detection switch which detects the closed state of the open/close cover 8 becomes on, and the detection signal is supplied to the control device 2. the above detection signal alone will not start the driving of the disk drive device 10.

Then, the buckle 9 is pushed up, and the engagement body 9b is engaged with the engagement receiving section 26. Thereby, the open/close cover 8 is firmly locked to the player main body 6 through the buckle 9. At this time, the open/close protrusion 156 is inserted into the buckle detection hole 27 by completely closing the buckle 9. As a result, the detection switch which detects the locked state of the buckle 9 becomes on, and the detection signal is supplied to the control device 2. As the detection signal and the above-described detection signal for the open/close cover are supplied to the control device 2, driving the disk drive device 10 can be started.

The DVD player 1 which has completed preparation for use as described above can be used indoors, and is also preferable used outdoors. In such a case, the DVD player 1 is preferably configured, for example, to be capable of being hung with the use of a not-shown strap, that is, capable of being carried around while hung from a neck or the like.

As a result, by operating the control device 2 while holding it with hand, images of information recorded on an optical disk may be readily enjoyed outdoors, using the liquid crystal display 51 of the control device 2. Moreover, voices of information recorded on the optical disk may be enjoyed with earphones connected to the earphone jack 30.

Figure 17A:
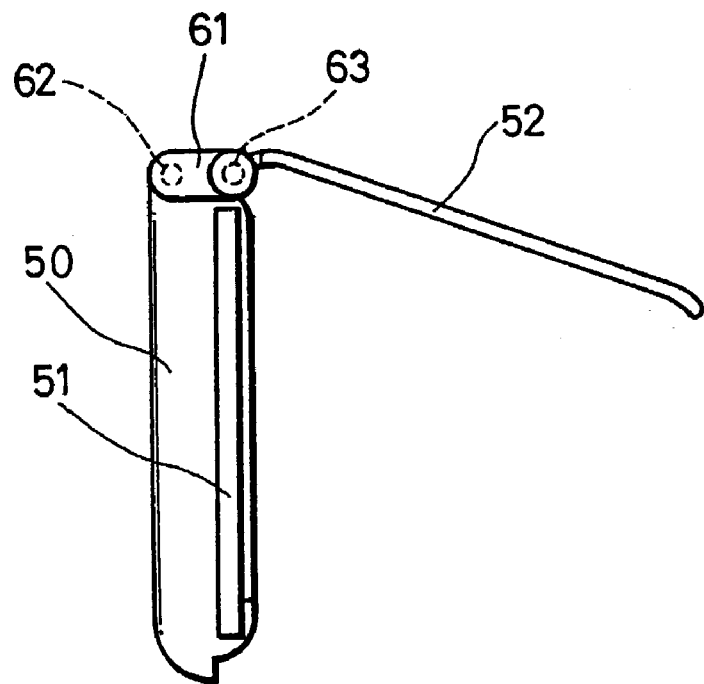
FIG. 17A is a side view of the cover body which is opened at an angle of a little bit smaller than 90 degrees.

Then, one embodiment of operation of the control device 2 will be described. FIG. 17A shows a state in which a user holds the control device 2 with hands and the cover body 52 is opened at an angle a little bit less than 90 degrees to the liquid crystal display 51 of the display surface of the cabinet 50.

In this case, it is assumed that a frictional force which is generated between the second spring pin 63 of the second rotating shaft and the connection block 61 is smaller than a frictional force which is generated between the spring pin 62 of the first rotating shaft and the connection block 61 (for example, the thickness of the spring pin 62 is set to be larger than that of the thickness of the spring pin 63, and the elasticity of the spring pin 62 is set to be larger than that of the elasticity of spring pin 63.).

Thereafter, in a state that the first rotating shaft is fixed, the cover body is rotated about the second rotating shaft in the first place. Thereafter, after the amount of rotation of the first rotating shaft becomes the maximum, the cover body 52 is rotated about the first rotating shaft in the second place.

In the first place, hook the finger tip on the free end side of the cover body 52 and pull up the cover body 52. Thereby, as the frictional force caused by the spring pin 62 of the first rotating shaft is larger than that of the spring pin 63 of the second rotating shaft, the cover body 52 is rotated around the spring pin 63 of the second rotating shaft, and the second convex shaft section 63b.

Then, as shown in FIG. 17A, when the cover body 52 is stopped at an arbitrary angle narrower than 90 degrees, the cover body 52 is fixed by the frictional force of the spring pin 63 at an angle at which the body 52 has been stopped. In such a condition, though an operator may see contents displayed on the liquid crystal display 51, it is difficult for others to look in the contents, and it is possible to prevent the others from peeping at the contents from the surroundings.

Figure 17B:
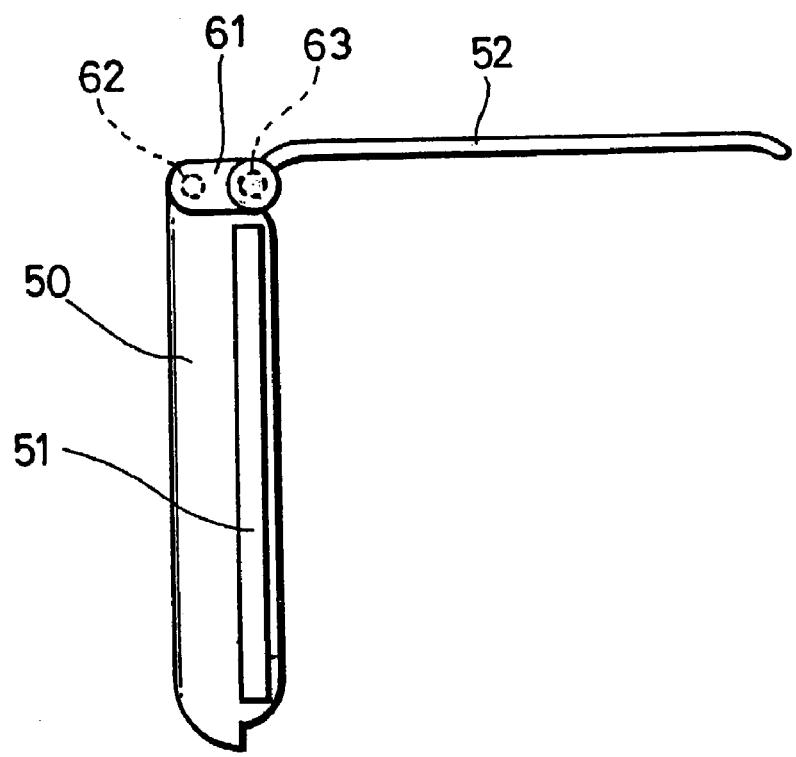
FIG. 17B is a side view of the cover body which is opened at an angle of approximately 90 degrees.

FIG. 17B shows a state in which a user holds the control device 2 with hands, and the cover body 52 is opened at an angle of 90 degrees to the liquid crystal display 51 of the cabinet 50. As the cover body 52 is stopped at an angle of near 90 degrees, the cover body 52 may be used as a sunshade.

Figure 18A:
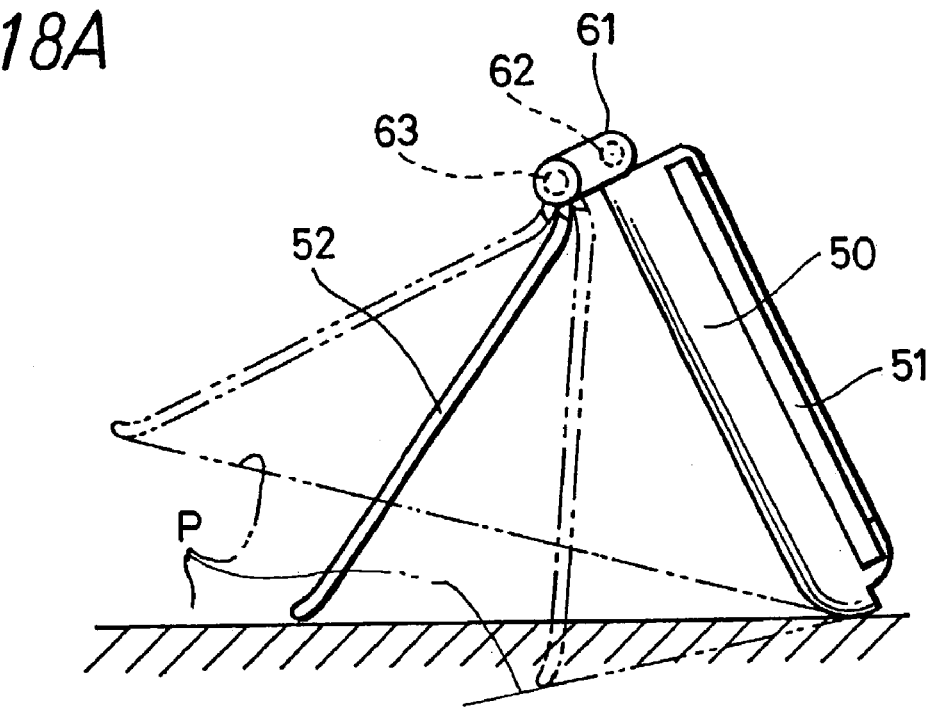
FIG. 18A is a side view of the cover body which is opened at an angle of approximately 270 degrees as a stand.

In addition, FIG. 18A shows a state in which the cover body 52 is rotated by an arbitrary angle equal to or larger than 270 degrees relative to the display surface of the cabinet 50, and the cabinet 50 and the cover body 52 each have the free ends thereof placed on a plane P such as a desk. The above state is caused after the connection block 61 is rotated from the state shown in FIG. 17B by 180 degrees about the spring pin 62 of the first rotating shaft and the first convex shaft section 62b.

Subsequently, the cover body 52 is rotated by an arbitrary angle smaller than 90 degrees about the spring pin 63 of the second rotating shaft and the second convex shaft section 63b. Thereby, as shown in FIG. 18A, the cover body 52 may be used as a stand for the cabinet 50. In this case, by changing the angle of inclination of the cover body 52 relative to the cabinet 50 the display surface of the liquid crystal display 51 can be freely set to a state by a user such that the user may easily see the display surface.

Figure 18B:
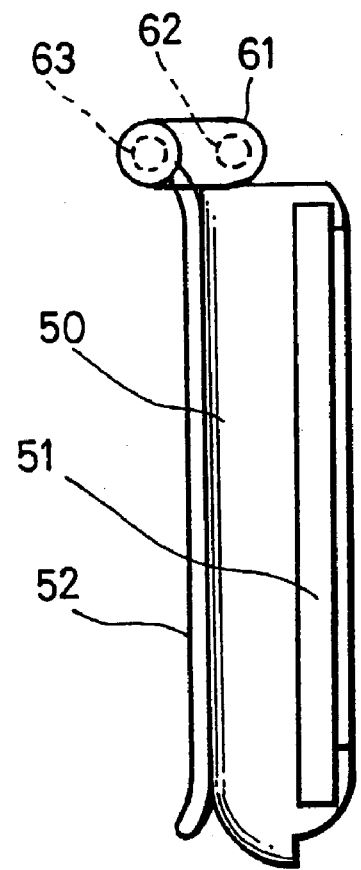
FIG. 18B is a side view of the cover body which is opened at an angle of approximately 360 degrees.

FIG. 18B shows a state in which the cover body 52 is rotated by an angle of 360 degrees to the display surface of the cabinet 50, and is overlapped on the back surface of the cabinet 50. In this case, it is possible to dispose the cover body 52 such that the body 52 will not become an obstacle when a user sees the display surface while holding the control device 2 with hands.

Figure 19A:
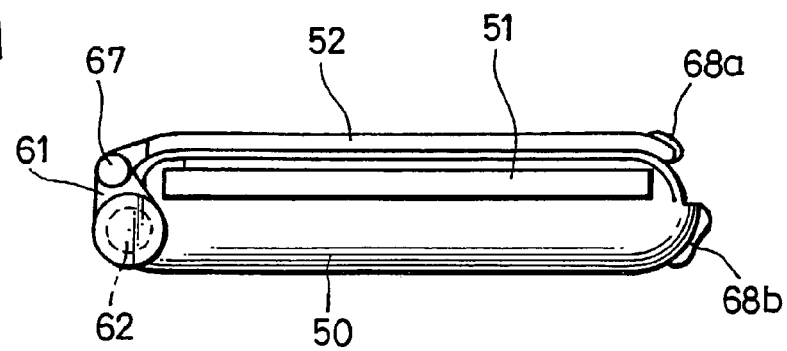
FIG. 19A is a side view of the cover body which is closed.

FIG. 19A shows one example in which a rotating shaft 67 is provided instead of the second spring pin 63 of the second rotating shaft, out of two spring pins 62 and 63 which are used in the above control device 2, and the cover body 52 and the connection block 61 are rotatably connected through the rotating shaft 67. In this case, the protruding rails of the cabinet 50 and the connection block 61 are rotatably connected with a frictional force caused by the elasticity of the spring pin 62 as in the above embodiment. Here, anti-slipping rubber 68a, 68b is stuck as a anti-slipping member on each free end of the cover body 52 and the cabinet 50.

Figure 19B:
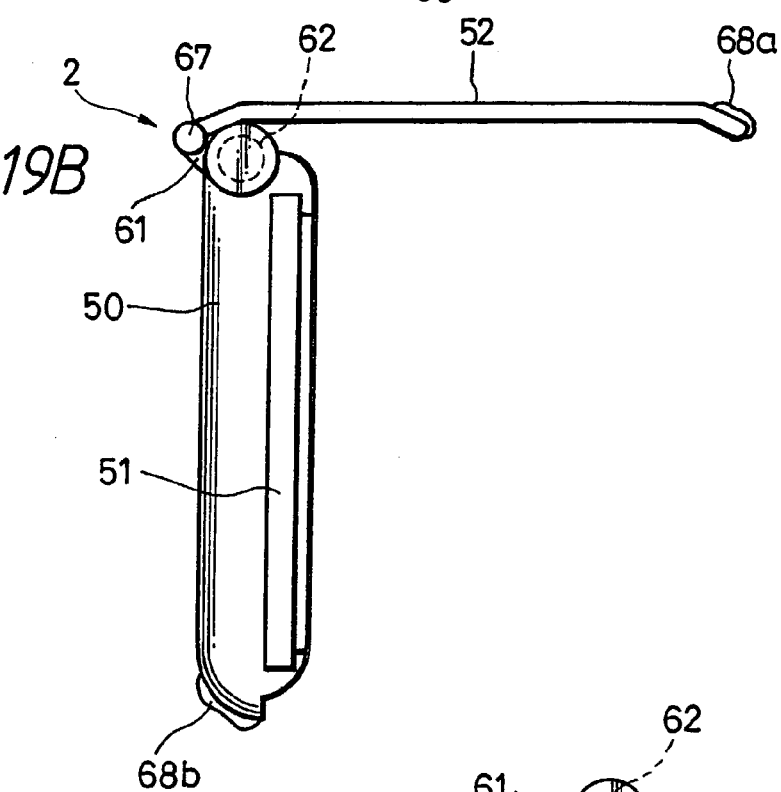
FIG. 19B is a side view of the cover body which is opened at an angle of approximately 90 degrees.

FIG. 19B explains the operation of the control device 2 shown in FIG. 19A. It is shown that a user holds the control device 2 with hands, and the cover body 52 is opened at an angle of 90 degrees to the display surface of the cabinet 50. Thereby, the display surface may be easily seen by using the cover body 52 as a sunshade.

As described above, although the rotating shaft 67 connects the cover body 52 and the connection block 61 rotatably without accompanying the frictional force by moving the rotating shaft 67 in the diagonally backward direction of the spring pin 62, the cover body 52 may be kept at a position to which the body 52 is rotated by an angle of approximately 90 degrees to the display surface of the cabinet 50 only with the frictional force based on the elasticity between the spring pin 62 and the connection block 61.

Figure 19C:
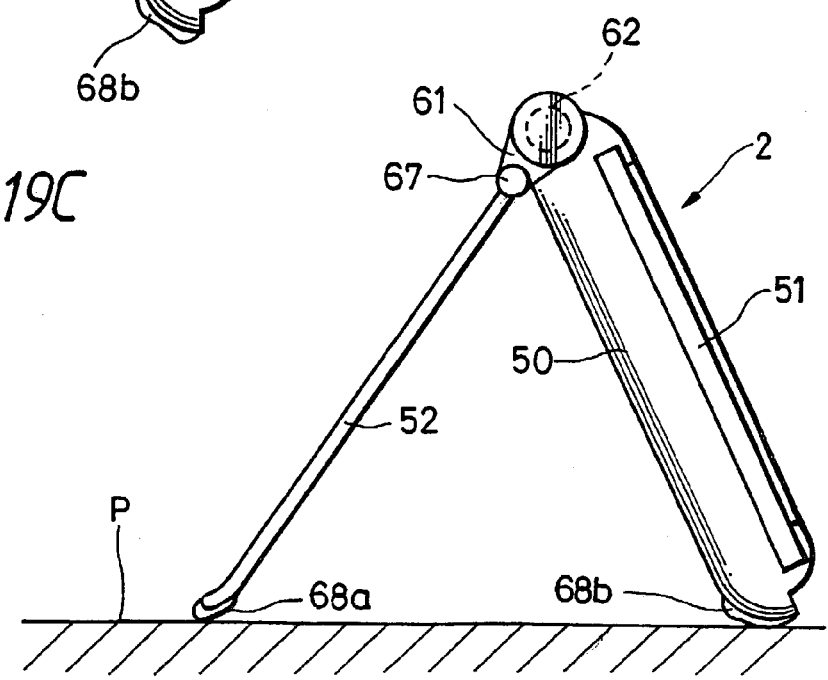
FIG. 19C is a side view of the cover body which is opened at an angle of approximately 270 degrees.

FIG. 19C shows that the cover body 52 is rotated by an arbitrary angle equal to or larger than 270 degrees to the display surface of the cabinet 50, and the cabinet 50 and the cover body 52 each have free ends placed on a plane P such as a desk. Thereby, the cabinet 50 may be kept standing on a horizontal plane by using the cover body 52 as a stand. In this manner, by changing the angle of inclination of the cover body 52 relative to the cabinet 50, the display surface of the cabinet 50 can be freely set to a state by a user such that the user may easily see the display surface.

Moreover, as anti-slipping rubber 68a, 68b is fitted to each of the free ends of the cabinet 50 and the cover body 52, there is no possibility that the control device 2 slides on a plane P such as a desk. Accordingly, the inclination angle of the cabinet 50 may be kept at an arbitrary angle by using the cover body 52 as a stand, even when the rotating shaft 67 is used as the one rotating shaft.

Figure 20:
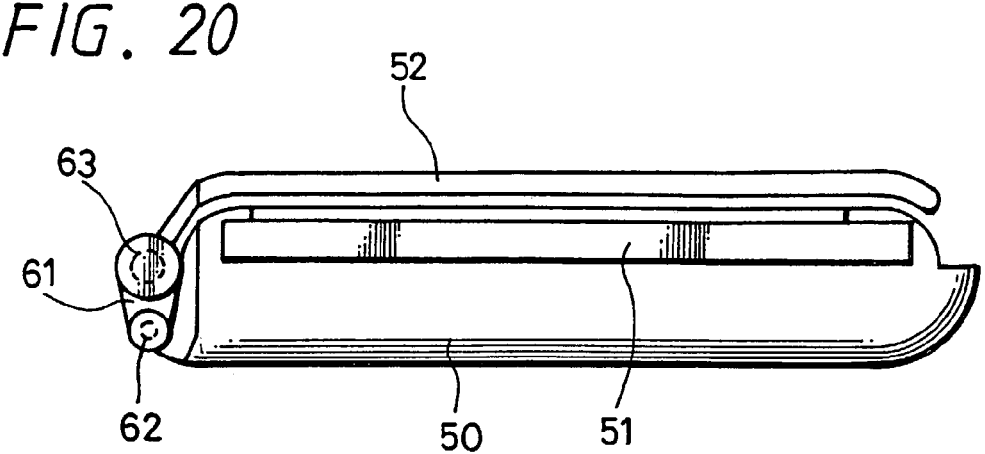
FIG. 20 shows a third embodiment according to the present invention, and is a side view of the cover body which is closed.

FIG. 20 shows one example in which the diameters of two spring pins 62 and 63 are changed for different elasticities. For example, it is assumed that, of one pair of spring pins 62 and 63, the diameter of the first spring pin 62 is smaller, and that of the second spring pin 63 is larger, and the frictional force of the second spring pin 63 is larger than that of the first spring pin 62. Also in the present embodiment, the same as in the embodiment shown in the above FIG. 17A, 17B and the like, the spring pin 62 with a smaller elasticity is configured to be preferentially rotated, and rotating of the spring pin 63 with a larger elasticity is started after the rotating amount of the spring pin 62 becomes the maximum.

In this case, in either of the occasions in which the cover body 52 is opened and closed to the display surface of the cabinet 50 the cover body 52 is rotated about the first rotating shaft with the spring pin 62 with a smaller elasticity in the first place, and the body 52 is rotated about the second rotating shaft with the spring pin 63 with a larger elasticity in the second place.

That is, the connection block 61 is rotated relative to the cabinet 50 about the spring pin 62 in the first place by open/close operation of the cover body 52. The cover body 52 is rotated relative to the connection block 61 about the spring pin 63 in the second place. In the present embodiment, of the first and the second rotating shafts which are disposed parallel to each other, the rotating shaft with the spring pin 62 having a smaller elasticity is preferentially rotated, and rotating of the cover body 52 relative to the cabinet 50 may be smoothly executed.

Figure 21A:
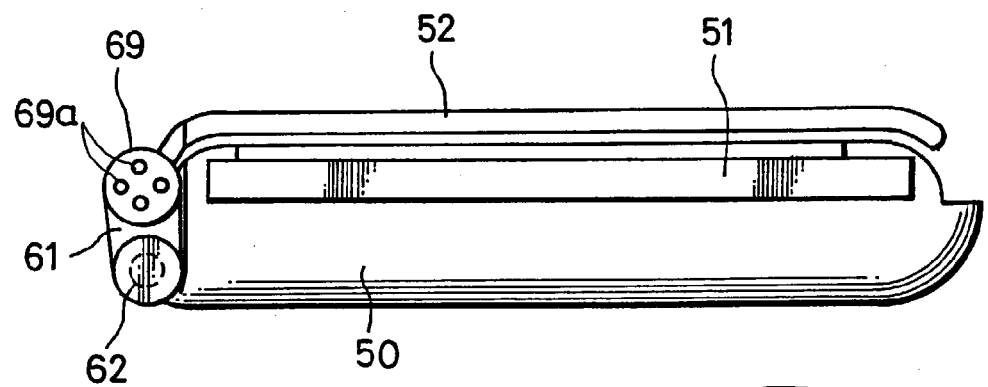
FIG. 21A is a side view of the cover body which is closed and FIG. 21B is an explanatory view of a clicking plate which is enlarged and exploded.

FIG. 21A shows one example in which a clicking plate 69, instead of one of the above two spring pins, for example, the spring pin 63, is provided as resisting means. In the control device 2 shown in the present embodiment, the angle of the cover body 52 relative to the display surface of the cabinet 50 may be changed over to multiple stages of every predetermined angle(four stages of every 90 degrees in the present embodiment). Here, both of the frictional force of the clicking plate 69 and that of the spring pin 63 may be configured to have the same magnitude, or different magnitudes for each frictional force.

Figure 21B:
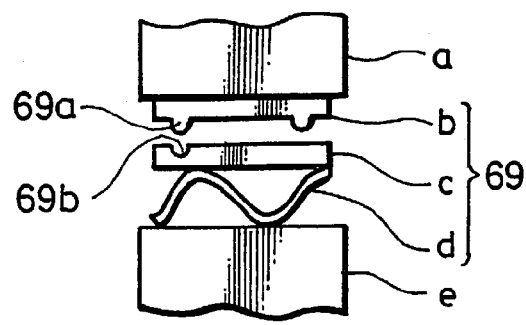

FIG. 21B shows an exploded and enlarged view of the clicking circular plate 69 shown in FIG. 21A. A clicking convex circular plate is fixed to the base a of the cover body 52 with fixing means such as adhesives. Four convex sections 69a are concyclically disposed at equal intervals in the circumferential direction on the clicking convex circular plate b. The clicking convex circular plate c is configured to be facing the clicking concave circular plate b.

One concave section 69b which is disposed concyclically relative to the four convex section 69a and can detachably engage with each convex section 69a is provided on one surface of the clicking concave circular plate c. One surface of a ring-like corrugated plate spring d is fixed on the other surface of the clicking concave circular plate c with fixing means such as welding or the like. The other surface of the corrugated plate spring d is fixed on the base e of the connection block 61 with fixing means such as adhesives.

Thus, the clicking circular plate 69 has a structure by which the clicking convex circular plate b, the clicking concave circular plate c, and the corrugated plate spring d are laminated. The clicking circular plate 69 is located between the base a of the cover body 52 and the base e of the connection block 61.

Thus, when the cover body 52 is rotated, a frictional force is generated by the elasticity of the corrugated plate spring d until any one of four convex sections 69a of the clicking convex circular plate b protrudes from the concave section 69b of the clicking concave circular plate c, and the other convex sections 69a adjacent to each other are engaged. The cover body 52 is held at an arbitrary angle to the display surface of the cabinet 50 by the above frictional force.

And, the cover body 52 is locked at a predetermined angle to the display surface of the cabinet 50 by engaging the convex section 69a of the clicking convex circular plate b with the concave section 69b of the clicking concave circular plate c. Thereafter, by extracting the convex section 69a from the concave section 69b with the rotation of the cover body 52, there occurs a click feeling as the cover body 52 is rotated. Thus, change in the angle of the cover body 52 is surely sensed by finger touch, using the click feeling at insertion or extraction of the convex section 69a into or from the concave section 69b.

FIG. 22A shows one example in which the above-described two clicking positions of the clicking plate 69 are set to two points, and the clicking plate 69 is provided on the first rotating shaft, and the spring pin 63 is provided on the second rotating shaft. Two convex sections 69a which are disposed concyclically at equal distances in the circumferential direction on the clicking plate 69. Here, the structures of the clicking concave circular plate c and the corrugated plate spring d are the same as in the above described embodiments.

In this case, both of the frictional force of the clicking plate 69 and that of the spring pin 63 may be configured to have the same magnitude, or different magnitudes for each frictional force. In the present embodiment, one example in which the frictional force of the clicking plate 69 is configured to be larger than that of the spring pin 63 has been shown.

As shown in FIG. 22B, when the cover body 52 is opened, the second rotating shaft with a smaller frictional force is rotated in the first place, and the first rotating shaft with a larger frictional force is rotated in the second place, When a pull-up force is applied on the free end of the cover body 52, the cover 52 is opened at an angle of a little over 180 degrees to the display surface of the cabinet 50 with the spring pin 63, which is the second rotating shaft, as the center of rotation. At this time, a frictional force is generated between the spring pin 63 and the connection block 61, and the cover body 52 is rotated accompanying a frictional force by the elasticity of the spring pin 63.

Subsequently, as shown in FIG. 22C, when the cover body 52 is further opened, the clicking plate 69 and the connection block 61 are rotated by 180 degrees with the clicking plate 69, which is the first rotating shaft, as the center of rotation. Accordingly, the cover body 52 is opened at 360 degrees to the display surface of the cabinet 50, and the cover body 52 attaches to the back of the cabinet 50.

At this time, click feeling is generated by the clicking plate at the beginning and the end of rotation, and during rotation, the cover body 52 is rotated accompanying a frictional force by a spring force of the corrugated plate spring. As described above, the cover body 52 is rotated accompanying the click feeling and the frictional force.

FIG. 23 shows another embodiment of resisting means which gives loads to the cover body 52 when the body 52 is rotated. The resisting means described in the present embodiment comprises a gear device 83 and a damper device 87. A control device 2 described in this present embodiment is provided with the gear device 83 which comprises two gears 84a and 84b as resisting means instead of one of two spring pins which have been described above, for example, the spring pin 62, and the damper device 87.

The rotating shaft 85 is provided as a first shaft in the control device 2, and the connection block 61 is fixed in the middle portion in the axial direction of the rotating shaft 85. One end of the rotating shaft 85 is protruding sideways, passing through the cabinet 50, and a small-diameter gear

84a is fixed to the protruding section. A large-diameter gear 84b is configured to engage with the small-diameter gear 84a, and a shaft section 88 which is protruding from one side is provided in the large-diameter gear 84b.

The shaft section 88 of the large-diameter gear 84b is rotatably passing through the side surface of the cabinet 50. And, the tip of the shaft section 88 is inserted into the damper device 87 which is held in the cabinet 50. The damper device 87 gives a resisting force such as an adhesive force and a frictional force at rotating of the shaft section 88, and, for example, a liquid damper which uses the liquid, and other types of damper devices may be used as the device 87. 86 is a gearbox which covers the large and small gears 84a and 84b.

In the present embodiment, when the cover body 52 is pulled up, and the connection block 61 is rotated, the rotation shaft 85 and the small-diameter gear 84a are rotated integrally with the connection block 61. As the large-diameter gear 84b engages with the small-diameter gear 84a at any time, the shaft section 88 is rotated by an amount corresponding to the reduction ratio between the gears 84a and 84b. A resisting force is applied on the damper device 87 according to the rotating amount of the shaft section 88, and the connection block 61 is rotated relative to the cabinet 50 accompanied by the above resisting force. Thereby, the cover body 52 may be configured to be rotated in a smooth way with an adequately resisting force, and, at the same time, the cover body 52 may be reliably fixed at an arbitrary position in the middle way of the rotating.

The control device 2 with the above configuration is not limited to use for the DVD player 1 in the above embodiments, but it is also preferably used for, for example, PDA (Personal Digital Assistants), a small word processor, a small microcomputer, an electronic dictionary, a portable television set, and a small electronic clock. Moreover, it may be also applied for desktop-type devices of the above-listed electronic devices, and other electronic devices.

Figure 13:
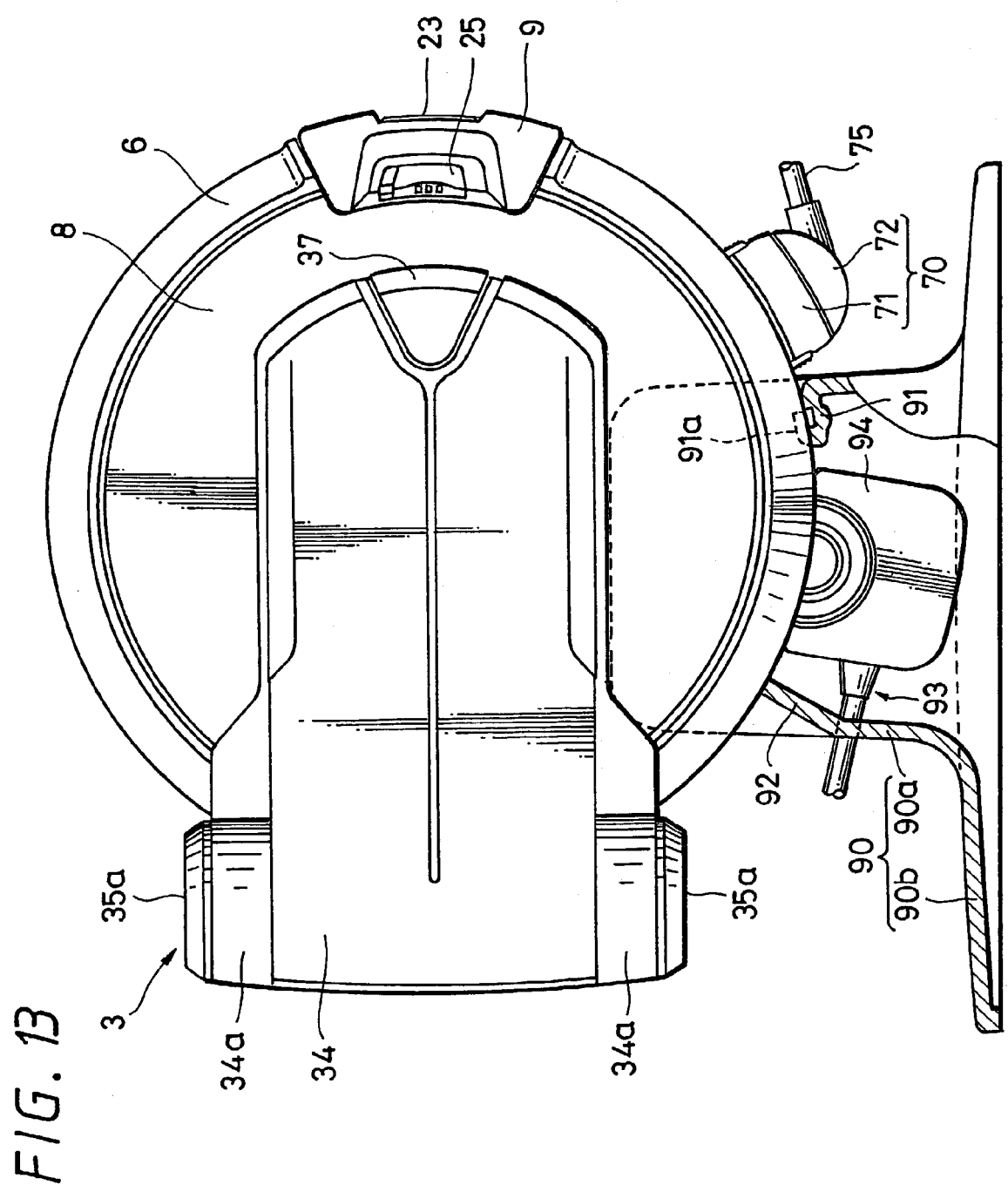
FIG. 13 is an explanatory view of a holding stand part-cut off and illustrates the state of charging the DVD player shown in FIG. 2 for electric power.

In addition, FIG. 13 shows a state in which the DVD player 1, a not-shown domestic power supply and the like are connected to each other for charging the battery chassis body 3 of a power-supply device. In FIG. 13, a numeral 90 represents a holding stand which keeps and holds the player main body 6. The holding stand 90 comprises a holding section 90a in which holding grooves are formed on the upper surface, and a holding platform 90b which is continuous from the lower part of the holding section 90a. A holding platform 90b of the holding stand 90 is extendedly and widely formed such that a sufficiently large mounting surface is secured.

Furthermore, supporting pieces 91 and 92 which supports the side surface of the player main body 6 are provided at both sides of the holding section 90a in the direction of the holding grooves. A pawl section 91a which engages with a concave part provided on the side surface of the player main body 6 is provided in the tip section of one supporting piece 91. With the provision of the pawl section 91a, it is possible to securely hold the DVD player 1 weight distribution of which in the circumferential direction becomes badly balanced due to installation of the battery chassis body 3, without rolling even in a state in which the battery chassis body 3 is turned sideways.

Here, a numeral 93 shown in FIG. 13 represents a third connection cable which connects a power supply such as a domestic socket and the player main body 6. A charging plug 94 is fitted to one end of the connection cable 93. The charging plug 94 may be attached or detached to or from the second socket section 29 of the player main body 6. A terminal section is configured to be moved backward as one operation by pressing a semicircle part at the center of the charging plug 94 to release connection to the second socket section 29.

Though, as described above, the description has been made in the above-described embodiments, assuming, for example, that an information reproduction device is the DVD player 1, and the control device 2 is a remote control device with a liquid crystal display of the player 1, but the present invention is not limited to the above embodiments. And the invention may be also applied for electronic devices such as a portable CD player, and a portable disk drive device, and for their remote control devices.

Moreover, one example in which the player main body 6 and the control device 2 are connected to each other by wire has been described in the above-described embodiments, but it is needless to say that radio means may be configured to be applied as signal transmission means, wherein the player main body 6 and the control device 2 are connected to each other by radio for signal exchanging.

Thus, various modifications may be applied without departing from the true spirit and scope of the invention.

INDUSTRIAL APPLICABILITY

According to a display device of the present application, a cover body may be configured to have friction and to be rotated in a continuous manner, and, at the same time, as two rotating shafts which are parallel to each other are provided in a connection section between a cover body and a display device main body, and resisting means to generate a frictional force at rotating is provided on at least one of the rotating shafts. Moreover, the cover body may be used for protection of the display section and, at the same time, for a wall to prevent others from peeping the display section. Furthermore, the cover body may be also used as a stand for the display device main body.

What is claimed is:

1. A display device comprising:
   a display device main body having a display section;
   a connection section rotatably provided relative to said display device main body about a first rotating shaft arranged parallel to said display section;
   a cover body rotatably provided in said connection section about a second rotating shaft arranged parallel to said first rotating shaft, wherein said cover body opens and closes said display section; and
   resisting means provided on at least one of said first rotating shaft and said second rotating shaft of said connection section, wherein said resisting means generates a frictional force upon rotating one of said connection section and said cover body,
   wherein said resisting means comprises:
   a first spring pin arranged in said second rotating shaft rotatably connecting said cover body and said connection section, wherein a diameter of said first spring pin is elastically reduced; and
   a second spring pin arranged in said first rotating shaft rotatably connecting said connection section and said display device main body, wherein a diameter of said second spring pin is elastically reduced, and
   wherein said connection section comprises a first block and a second block that respectively catch said first and second spring pins, and a fixing screw that fixes the first block and the second block; and
   frictional forces of said first and second spring pins are adjusted by tightening the fixing screw.

2. The display device according to claim 1, wherein, said resisting means comprises a spring pin arranged in said second rotating shaft rotatably connecting said cover body and said connection section, wherein a diameter of said spring pin is elastically reduced, and said connection section and said display device main body are rotatably connected through said first rotating shaft.

3. The display device according to claim 1, wherein, said resisting means comprises a spring pin arranged in said first rotating shaft rotatably connecting said connection section and said display device main body, wherein a diameter of said spring pin is elastically reduced, and said cover body and said connection section are rotatably connected through said second rotating shaft.

4. The display device according to claim 1, wherein said first spring pin and said second spring pin have different respective elastic forces.

5. The display device according to claim 1, wherein said cover body functions as shading means to shade incidence light to said display section by rotating from a state, in which said display section is closed, in an opening direction about one of said first rotating shaft and said second rotating shaft, and upon rotation said cover body further functions as a stand to support said display device main body such that said display device main body is held at a predetermined angle to a mounting surface on which said display device main body is mounted; and a main plane of the cover body rests on a back opposing to the display section of said display device main body by further rotating.

6. A display device comprising:

a display device main body having a display section;

a connection section rotatably provided relative to said display device main body about a first rotating shaft arranged parallel to said display section;

a cover body rotatably provided in said connection section about a second rotating shaft arranged parallel to said first rotating shaft, wherein said cover body opens and closes said display section; and resisting means provided on at least one of said first rotating shaft and said second rotating shaft of said connection section, wherein said resisting means generates a frictional force upon rotating one of said connection section and said cover body, wherein said resisting means comprises a spring pin arranged in one of said first rotating shaft and said second rotating shaft that rotatably connects one of said cover body and said connection section and said connection section and said display device main body, wherein a diameter of said spring pin can be elastically reduced; and a clicking plate which rotatably connects the other of said first and second rotating shafts not containing said spring pin.

7. A display device comprising:

a display device main body having a display section;

a connection section rotatably provided relative to said display device main body about a first rotating shaft arranged parallel to said display section;

a cover body rotatably provided in said connection section about a second rotating shaft arranged parallel to said first rotating shaft, wherein said cover body opens and closes said display section; and resisting means provided on at least one of said first rotating shaft and said second rotating shaft of said connection section, wherein said resisting means generates a frictional force upon rotating one of said connection section and said cover body, wherein, said resisting means comprises a spring pin arranged in one of said first rotating shaft and said second rotating shaft that rotatably connects one of said cover body and said connection section and said connection section and said display device main body, wherein a diameter of said spring pin can be elastically reduced; and a gear device and a damper device that rotatably connect the other of said first and second rotating shafts not containing said spring pin.

* * * * *

UNITED STATES PATENT AND TRADEMARK OFFICE
CERTIFICATE OF CORRECTION

PATENT NO. : 7,057,886 B2
APPLICATION NO. : 10/276930
DATED : June 6. 2006
INVENTOR(S) : Yano et al.

It is certified that error appears in the above-identified patent and that said Letters Patent is hereby corrected as shown below:

On title page Item (56) Col. 2 add:

--Foreign Application Priority Data
March 22, 2001, Japan, P2001-083321
June 28, 2001, Japan, P2001-197541--

Signed and Sealed this

First Day of August, 2006

JON W. DUDAS
*Director of the United States Patent and Trademark Office*